United States Patent [19]

Hitomi et al.

[11] Patent Number: 5,433,180
[45] Date of Patent: Jul. 18, 1995

[54] INTERNAL COMBUSTION ENGINE WITH SUPERCHARGER

[75] Inventors: Mitsuo Hitomi; Shunji Masuda; Toshihiko Hattori; Kenji Kashiyama; Junsou Sasaki, all of Hiroshima, Japan

[73] Assignee: Mazda Motor Corporation, Hiroshima, Japan

[21] Appl. No.: 324,489

[22] Filed: Oct. 18, 1994

Related U.S. Application Data

[63] Continuation of Ser. No. 935,983, Aug. 27, 1992, abandoned.

[30] Foreign Application Priority Data

Aug. 27, 1991 [JP] Japan .................. 3-240608

[51] Int. Cl.⁶ .............................................. F02B 29/00
[52] U.S. Cl. ........................... 123/311; 123/559.1
[58] Field of Search ............ 123/568, 570, 571, 90.4, 123/90.15, 90.16, 90.17, 368, 432, 559.1, 311

[56] References Cited

U.S. PATENT DOCUMENTS

| | | | |
|---|---|---|---|
| 3,608,530 | 9/1971 | Wenzel | 123/56 BC |
| 4,117,813 | 10/1978 | Yamashita et al. | 123/90.15 |
| 4,191,135 | 3/1980 | Nohira et al. | 123/316 |
| 4,703,734 | 11/1987 | Aoyama et al. | 123/90.15 |
| 4,722,315 | 2/1988 | Pickel | 123/90.15 |
| 4,819,591 | 4/1989 | Valentine | 123/90.4 |
| 4,924,840 | 5/1990 | Wade | 123/568 |
| 4,958,606 | 9/1990 | Hitomi et al. | 123/90.15 |
| 5,025,759 | 6/1991 | Wenzel et al. | 123/56 BC |
| 5,031,582 | 7/1991 | Kruger | 123/90.15 |
| 5,046,462 | 9/1991 | Matayoshi et al. | 123/90.16 |
| 5,133,310 | 7/1992 | Hitomi et al. | 123/90.16 |

FOREIGN PATENT DOCUMENTS 58-175122  11/1983  Japan .

Primary Examiner—Henry C. Yuen
Assistant Examiner—M. Macy
Attorney, Agent, or Firm—Fish & Richardson

[57] ABSTRACT

An internal combustion engine with a supercharger with a piston arranged to be inserted into a cylinder so as to move in a reciprocating way, which has a bore size of the cylinder ranging from approximately 43 mm to 67 mm; a volume of a single chamber of the cylinder ranging from approximately 110 cc to 400 cc; a ratio of a stroke of the piston to the bore size of the cylinder being larger than 1; and a compression ratio of the engine being 9 or larger.

48 Claims, 16 Drawing Sheets

INTERNAL COMBUSTION ENGINE WITH SUPERCHARGER

This application is a continuation of U.S. application Ser. No. 07/935,983, filed Aug. 27, 1992, now abandoned.

BACKGROUND OF THE INVENTION

1. Field of the Invention

The present invention relates to an internal combustion engine with a supercharger.

2. Description of the Related Art

Conventional supercharged internal combustion engines are usually provided with superchargers, having a compression ratio smaller than that of engines of a natural intake type (NA engines). For example, a Honda "City Turbo II" engine described in a magazine "Motor Fans", page 117, January, 1984, has a specification as follows:

(1) Type of Engine: Water-cooling, in-line 4-cylinder
(2) Displacement: 1,231 cc
(3) Bore size of cylinder: 66 mm
(4) Stroke of piston: 90 mm
(5) Compression ratio ($\epsilon$): 7.6
(6) Supercharger: Turbocharger (charging pressure, 0.85 kg per cm$^2$)

Further, a Honda "City Turbo II-R" engine, i.e. a racing engine of the City Turbo II engine, has a charging pressure increased to 1.63 kg per cm$^2$, although its compression ratio is not known.

Internal combustion engines with superchargers are adapted to forcibly fill their cylinders with a mixed fuel so that they have the tendency that the temperature of exhaust gases becomes higher than that of exhaust gases from the NA engines. As the magnitude of the charging pressure becomes higher, the extent to which the temperature of the exhaust gases elevates becomes larger, and there is the risk that reliability upon an exhaust system may be impaired due to exhaust gases having high temperature, particularly at the time when the engine is running with a full open load. It can be noted herein that the "City Turbo II-R" engine is so designed as to be run for two to three hours, not for a long period of time, with a full open load, so that no problem with reliability upon the exhaust system may arise even if the temperature of the exhaust gases would be high.

SUMMARY OF THE INVENTION

Therefore, the object of the present invention is to provide an internal combustion engine with a supercharger, so adapted as to suppress the temperature of exhaust gases from elevating and to improve reliability upon an exhaust system.

In order to achieve the object as described hereinabove, the supercharged internal combustion engine according to the present invention basically sets its compression ratio ($\epsilon$) to $\epsilon = 8$ or higher to suppress the temperature of the exhaust gases from elevating.

This will be described hereinafter more in detail with reference to FIG. 20 which in turn is a diagram wherein the solid line indicates the supercharged engine according to the present invention and the broken line indicates the conventional supercharged engine. As is apparent from FIG. 20, the supercharged engine according to the present invention has an expansion ratio, or compression ratio ($\epsilon'$), elevated from a conventional compression ratio ($\epsilon$), so that the temperature ($T_4'$) of the exhaust gases from the engine according to the present invention becomes lower than the temperature ($T_4$) of the exhaust gases from the conventional engine tested. In FIG. 20, the compression ratio ($\epsilon'$) for the engine according to the present invention is represented by $\epsilon' = Vd'/Vo'$ (where reference symbol V denotes the volume of the cylinder), and the compression ratio ($\epsilon$) for the conventional engine tested is represented by $\epsilon = Vd/Vo$ (where reference symbol V denotes the volume of the cylinder). It is noted in FIG. 20 that a range indicated by reference points 1 and 2 denotes a stroke of compression; a range indicated by reference points 2 and 3 denotes a stroke of explosion; a range indicated by reference points 3 and 4 denotes a stroke of expansion; and a range indicated by reference points 4 and 1 denotes a stroke of exhaustion.

The supercharged internal combustion engine according to the present invention is so arranged as to have the bore size (a diameter of the bore) of the cylinder, a volume of a single chamber of the cylinder, and a ratio of a stroke of the piston to the bore size (a S/B ratio) as follows:

(1) Bore size of cylinder: from approximately 43 mm to 67 mm;
(2) Volume of single chamber: from approximately 110 cc to 400 cc; and
(3) S/B ratio: >1.

Although the supercharged engines are likely to cause the problem with knocking, it is preferred that the bore size of the cylinder is set to the smallest possible size to shorten a distance over which flames develop and expand in order to improve anti-knocking performance. Further, when it is intended to gain the largest possible output by charging the pressure, it is required that the load upon a bearing section of a crank shaft that receives the pressure directly from the load of the piston, and it is preferred to make the bore size as small as possible in order to make the load upon the bearing section smaller.

When it is intended to ensure a predetermined volume of displacement by making the bore size smaller; however, in this case, at least two limits should be taken into consideration: firstly, a speed of the piston places the limit upon reliability; and secondly, the limit is placed from a rapid increase in the resistance to intake air due to choking associated with the shortening of a valve size of an intake valve. Hence, it is necessary to set the bore size to the smallest possible diameter within the range that satisfies these two limits. A description will now be made of the setting of the bore size that satisfies the two limits.

Limit upon reliability (the speed of the piston):

A mean speed of the piston Um (mm per second) can be represented by the formula (1) as follows:

$$Um = (N/30) \times S$$

where
N is the speed of rotation of the engine represented in rpm; and
S is the stroke of the piston as represented in millimeter.

It is said that a limit value of the mean speed of the piston, Um, is usually 20 m/s ($Um = 2.0 \times 10^4$ mm per second).

Thus, the formula (1) above can give the stroke of the piston by substituting $2.0 \times 10^4$ mm/s for Um and the maximum speed of rotation of the engine for N.

Limit from resistance to intake air (choking):

It is generally known that resistance to intake air increases rapidly when a mean intake air mach number, Mim, becomes Mim=0.5, thereby decreasing volume efficiency rapidly.

The mean intake air mach number, Mim, can be represented by the following formula (2) as follows:

$$Min = \frac{Vh \times (\eta_v/100)}{a \times Fim(e) \frac{(\theta_{IC} - \theta_{IO})}{6N}}$$

where
- Vh is the volume of the single chamber as represented in cc;
- $\eta_v$ is the efficiency in volume as represented in %;
- a is the sonic speed as represented in cm per second;
- $\theta$ is the angle of a crank as represented in deg. CA. ATDC;
- $\theta_{IC}$ is the timing for closing the intake valve;
- $\theta_{IO}$ is the timing for opening the intake valve;
- N is the speed of rotation of the engine as represented in rpm;
- Fi is the area of the opening of the intake valve as represented in cm²; and
- Fim(e) is the mean area of the opening of the intake valve as represented in cm².

The mean area of the opening of the intake valve, Fim(e), can be represented by the formula (3) as follows:

$$Fim(e) = Fia(e)/(\theta_{IC} - \theta_{IO})$$

where
Fia(e) is the effective angular area of the intake valve.

Then, the effective angular area of the intake valve, Fia(e), can be represented by the formula (4) as follows:

$$Fia(e) = \int_{\theta_{IO}}^{\theta_{IC}} \mu_i(\theta) \times Fi(\theta) d\theta$$

where
Fi is the area of the opening of the intake valve.

FIG. 21 shows the result of computation on the effective angular area of the intake valve, Fia(e), for the internal combustion engine having two intake valves and two exhaust valves for each cylinder, provided that the result of the computation is based on the assumption as follows:

(a) the two intake valves have the same valve sizes;
(b) the two exhaust valves have the same valve sizes;
(c) a ratio of an area of the intake valve to an area of the exhaust valve at their throat portions is 1.5 to 1; and
(d) the efficiency in volume ($\eta_v$) is set to 100%.

Further, the conditions for computing the effective angular area of the opening of the intake valve, Fia(e), are as follows:

(1) the distance between the valve seat of the first intake valve and the valve seat of the second intake valve is 2.5 mm or over;
(2) the distance between the valve seat of the intake valve and the valve seat of the exhaust valve is 3.5 mm or over;
(3) the distance between the valve seat of the first exhaust valve and the valve seat of the second exhaust valve is 4.0 mm or over;
(4) the distance between the valve seat of the intake valve and an ignition plug is 2.5 mm or over;
(5) the distance between the valve seat of the exhaust valve and the ignition plug is 3.5 mm or over;
(6) the valve seat may come into contact with a peripheral portion of the bore of the cylinder;
(7) the angle between the valves is 30°;
(8) the combustion chamber is of a penthouse type;
(9) the diameter of the plug is 14 mm;
(10) the diameter of a stem is 6 mm;
(11) the diameter of the throat portion=the diameter of the valve seat minus 5 mm;
(12) the length of a valve lift is 8.5 mm; and
(13) the timing for opening the valve is 256 deg CA.

The relation between the bore size and the volume of the single chamber, which satisfy the two limits as have been described hereinabove, will be considered in the procedures as will be described hereinafter.

Procedure 1: The stroke of the piston can be given from the formula (1) above when the speed of rotation of the engine is determined, which reaches Um=20 m/s (2.0×10⁴ mm per second) that is the limit value of the mean speed of the piston, Um. Further, the volume of the single chamber for each of the bore sizes can be given on the basis of the given stroke of the piston. FIG. 22 indicates the relation of the bore size with the volume of the single chamber that reaches Um=2.0×10⁴ mm per second; in FIG. 22, the one-dot-and-dash lines indicate the volumes of the single chamber corresponding to each of the bore sizes when the speeds of rotation of the engine are varied by each 1,000 rpm in the range from 4,000 rpm to 8,000 rpm.

Procedure 2: The volumes of the single chamber, which reach the mean intake air mach number Min=0.5 with respect to each bore size, are given from the formulas (1) to (4) above and the result of computation on the effective angular area of the intake valve Fia(e). In FIG. 22, the solid lines indicate the volumes of the single chamber given in Procedure 2 for every 1,000 rpm of the speed of rotation of the engine in the range from 4,000 rpm to 8,000 rpm.

Procedure 3: A description will be made of the relation between the speed of rotation of the engine that reaches the mean speed of the piston Um=20 m/s (2.0× 10⁴ mm per second), hereinafter referred to as "the speed of rotation of the engine $N_{20}$", and the speed of rotation of the engine that reaches the mean intake air mach number Mim=0.5, hereinafter referred to as "the speed of rotation of the engine $N_{0.5}$".

(1) If the speed of rotation of the engine $N_{0.5}$ is larger than the speed of rotation of the engine $N_{20}$, the bore size is set so as to allow a sufficient amount of the intake air to enter up to a speed higher than the limit upon reliability as described hereinabove. Hence, this is to the contrary of the original purpose that the bore size should be made smaller, so that the speed of rotation of the engine $N_{0.5}$ should be equal to or smaller than the speed of rotation of the engine $N_{20}$.

(2) It can be noted that the speed of rotation of the engine that produces the maximum horse power is generally set to the speed of rotation of the engine lower by approximately 1,000 rpm than the limit upon reliability.

It should be noted, however, that, if the speed of rotation of the engine $N_{20}$ becomes higher than the speed of rotation of the engine $N_{0.5}$, a flow of intake air per unit time does not increase, so that an axial output of the engine does not increase or it is decreased to a large extent at the speed of rotation of the engine which is equal to or higher than the speed of rotation of the engine $N_{0.5}$.

From the foregoing, it can be said that the point that produces the maximum horse power exists at the speed of rotation of the engine slower than the speed of rotation of the engine $N_{0.5}$.

For example, if the difference between the speed of rotation of the engine $N_{0.5}$ and the limit upon reliability would exceed 2,000 rpm ($N_{20}-N_{0.5}>2,000$), the horse power does not increase, or it is reduced, in a region where the speed of rotation of the engine is higher by 2,000 rpm or more than the speed of rotation of the engine at which the maximum horse power is produced. Hence, this case is not good so that the speed of rotation of the engine $N_{0.5}$ and the speed of rotation of the engine $N_{20}$ should satisfy the relation that satisfies $N_{20}-N_{0.5} \leqq 2,000$ rpm.

(3) When the characteristics of the engine are to be set in the same manner as conventional engines, it is preferred that the speed of rotation of the engine that produces the maximum horse power should be set to larger than 6,000 rpm. Hence, the speed of rotation of the engine $N_{0.5}$ should be set to larger than 6,000 rpm.

(4) In order to ensure the predetermined volume in the single chamber and to minimize the bore size, it is necessary to place a limit upon the stroke of the piston; however, even if the bore size would be minimized, it is not necessary to shorten the stroke of the piston to such an extent to which a limit is placed upon the speed of rotation of the engine so as to exceed by far the speed of rotation of the engine of the conventional engine. Hence, the speed of rotation of the engine $N_{20}$ should be set to 8,000 rpm or slower.

All the conditions given in the procedures as have been described hereinabove are described in FIG. 22. As shown in FIG. 22, the hatched area indicates an area wherein the engine having two intake valves and two exhaust valves for each cylinder meets the relation of the bore size vs. the volumes of the single chamber, which satisfies the aforesaid two limits. Hence, it is found from FIG. 22 that the bore size ranges from approximately 50 mm to 67 mm and the volume of the single chamber ranges from approximately 150 cc to 400 cc.

Likewise, a review has been made of the engine having three intake valves and two exhaust valves for each cylinder under the same procedures as have been described hereinabove. As shown in FIG. 22, the cross-hatched area indicates an area that meets the relation of the bore sizes with the volumes of the single chamber, which satisfies the two limits as have been described hereinabove. It is found from FIG. 22 that the bore size ranges from approximately 43 mm to 49.5 mm and the volume of the single chamber is in the range of from approximately 110 cc to 295 cc.

From the foregoing results, the range in which the bore size can be minimized is from approximately 43 mm to 67 mm and the range in which the predetermined volume of the single chamber can be ensured is from approximately 110 cc to 400 cc.

Further, it should be noted that a ratio of the stroke of the piston, S, to the bore size of the cylinder, B, is larger than one, i.e. $S/B>1$. In other words, the engine has a long stroke and the bore size is made smaller in order to ensure the same volumes in each of the single chambers. This arrangement can minimize a load upon a bearing of a crank shaft. In other words, when a large amount of output can be gained by charging the pressure under a small volume of the single chamber, the burden upon the bearing section can be reduced.

Other objects, features and advantages of the present invention will become apparent in the course of the description of the preferred embodiments, which follows, with reference to the accompanying drawings.

DETAILED DESCRIPTION OF THE PREFERRED EMBODIMENTS

Figure 1:
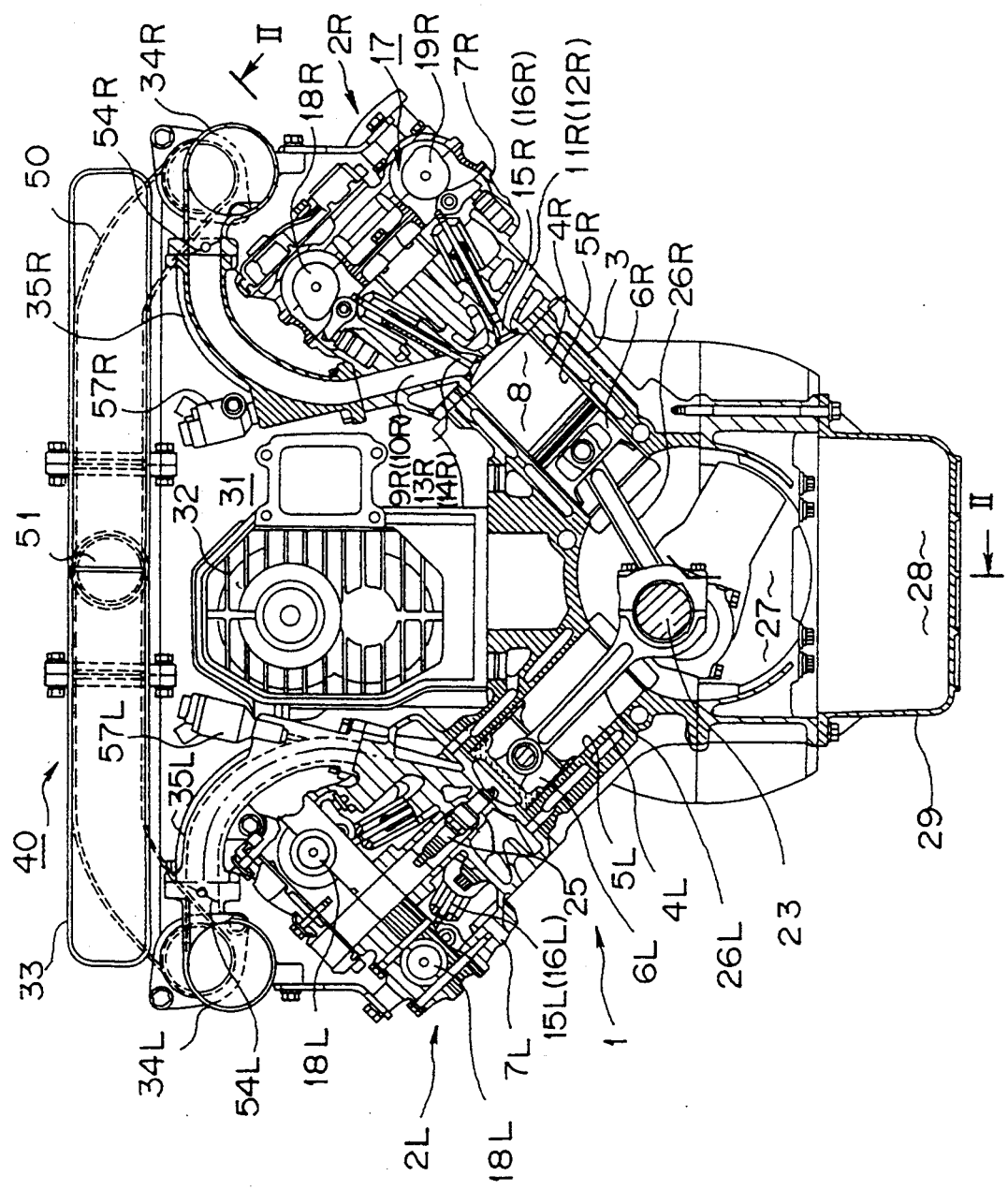
FIG. 1 is a longitudinal sectional view showing an embodiment of the spark ignition type reciprocating engine according to the present invention.
Figure 2:
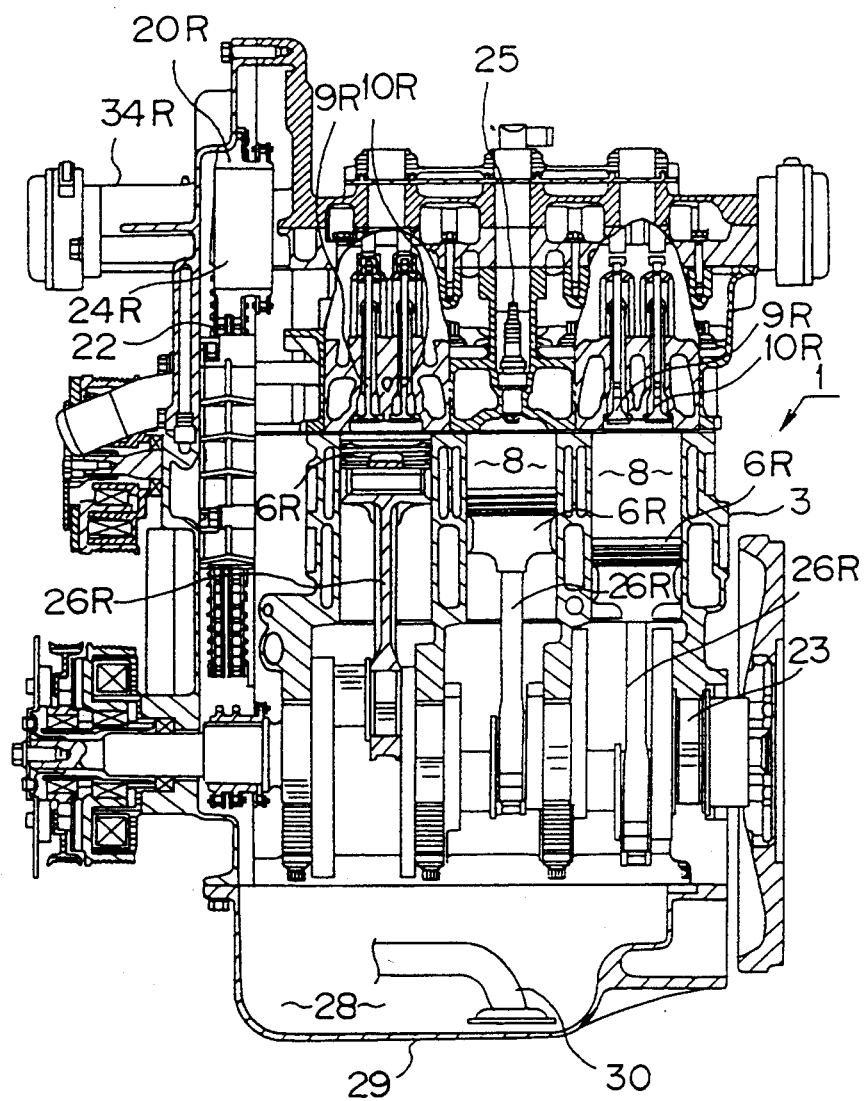
FIG. 2 is a sectional plan view taken along line II—II of FIG. 1.

The present invention will be described more in detail with reference to the accompanying drawings.
Structure of Engine:

As shown in FIGS. 1 and 2, a body 1 of the engine has a left-hand bank portion 2L and a right-hand bank portion 2R arranged in a V-shaped relationship. Three cylinders, as collectively referred to as 4, are arranged in each of the left-hand and right-hand bank portions 2L and 2R in line with each of the bank portions. In other words, the internal combustion engine to be employed for the embodiment of the present invention is a so-called V-type 6-cylinder engine. In the description which follows, reference symbols "L" and "R" used as suffixes, as needed, are intended to mean "left-hand" and "right-hand", respectively.

A detailed description will be made of the body 1 of the engine. The body 1 of the engine has a cylinder block 3 and each of the cylinders 4 has a combustion chamber 8 of a penthouse type formed and delimited by a piston 6 inserted into a cylinder section 5 and a cylinder head 7. As specifically shown in FIG. 1, the cylinder head 7 is provided with first and second intake ports 9 and 10 as well as first and second exhaust ports 11 and 12, each having an opening at the combustion chamber 8. As further shown in FIG. 1, a first intake valve 13 is mounted to the first intake port 9 and a second intake valve 14 is mounted to the second intake port 10; and a first exhaust valve 15 is mounted to the first exhaust port 11 and a second exhaust valve 16 is mounted to the second exhaust port 12.

The body 1 of the engine to be employed in this embodiment of the present invention is a 4-valve type engine having two intake valves 13 and 14 and two exhaust valves 15 and 16 for each cylinder. A valve-operating system 17 for operatively opening and closing the valves 13-16 is of a so-called double overhead cam (DOHC) type, which has two cam shafts 18 and 19 accommodated in the cylinder head 7. In other words, the first cam shaft 18 is adapted to operatively open and close the intake valves 13 and 14, and the second cam shaft 19 is adapted to operatively open and close the exhaust valves 15 and 16. As shown in FIG. 2, each of the first and second cam shafts 18 and 19 is provided at its shaft end with a cam pulley 20 for the intake valve (although a cam pulley for the exhaust valve is not shown in the drawing). The cam pulley 20 is mechanically associated with an output shaft (a crank shaft) 23 of the engine through a timing belt 22, in a manner as is known to the art, thereby opening and closing the intake valves 13, 14 and the exhaust valves 15, 16 at a predetermined timing, in synchronization with the rotation of the output shaft 23 of the engine.

To the first cam shaft 18 is mounted a first valve timing change-over mechanism 24 (for the intake valves) for changing a phase of the first cam shaft 18 for the cam pulley 20 for the intake valves, and the second cam shaft 19 is provided with a second valve timing change-over mechanism (for the exhaust valves) for changing a phase of the second cam shaft 19 for the cam pulley for the exhaust valves, although not shown in the drawing. The second valve timing change-over mechanism for the exhaust valves has the same structure as the first valve timing change-over mechanism 24 for the intake valves so that a description of the details of the second valve timing change-over mechanism will be omitted from the description which follows. To each of the cylinder heads 7 is mounted an ignition plug 25 so as to face or direct to the center of the combustion chamber 8.

The piston 6 is connected to the crank shaft 23 through a connecting rod 26, and a chamber 28 for reserving or storing engine oil is formed by an oil pan 29 in a region underneath a crank chamber 27 for accommodating the crank shaft 23. In FIG. 2, reference numeral 30 denotes an oil strainer.

As shown in FIG. 1, a central space 31 interposed between the left-hand bank portion 2L and the right-hand bank portion 2R is provided with a supercharger of a screw type, capable of being mechanically driven by the force of rotation of the crank shaft 23. Above the supercharger 32 is mounted an intercooler 33. Above each of the left-hand and right-hand bank portions 2L and 2R is disposed a surge tank 34 extending lengthwise along the crank shaft 23, and the surge tank 34 is connected to the intake ports 9 and 10 for each cylinder 4 through a discrete intake tube 35. As an upstream end of each of the intake ports 9 and 10 in the respective left-hand and right-hand bank portions 2L and 2R is disposed so as to open facing the central space 31 interposed between the bank portions, the discrete intake tube 35 is arranged in such a shape as firstly extending transversely from the surge tank 34 toward the central space 31 and then curving downward.

A detailed description will now be made of an intake system 40 for the body 1 of the engine with reference to FIG. 3.

The intake system 40 comprises a common intake tube 41, the left-hand surge tank 34L, the right-hand surge tank 34R, and the discrete intake tube 35, which are disposed in this order from the upstream side toward the downstream side. To the common intake tube 41 are disposed an air cleaner 42, an air flowmeter 43, a throttle valve 44, the supercharger 32 of the screw type, and the intercooler 33 in this order from the upstream side toward the downstream side. The common intake tube 41 has a first bypass 45 disposed so as to bypass the throttle valve 44, and a second bypass 46 disposed so as to bypass the supercharger 32 and the intercooler 33.

The first bypass 45 is provided with an ISC valve 47 which in turn can adjust the number of idling rotation in a manner as is known to the art. The second bypass 46 has a relief valve 49 that can be driven with an actuator 48 of a diaphragm type to release the charged pressure by opening the relief valve 49 and opening the second bypass 46 when the charged pressure becomes higher than a predetermined level of pressure. On the other hand, the left-hand surge tank 34L is communicated with the right-hand surge tank 34R through a connecting tube 50 which in turn is provided in its intermediate position with a valve 51 for controlling intake air variably, for example, thereby opening and closing the valve 51 in accordance with the number of rotation of the engine and achieving the dynamic effect of intake air over a wide region in a manner as is known to the art.

The discrete intake tube 35 is provided with a partition wall 35a to thereby divide its internal space partially into left-hand and right-hand sections, i.e. a first discrete intake tube 52 and a second discrete intake tube 53. The first discrete intake tube 52 is connected with the first intake port 9, and the second discrete intake tube 53 is connected with the second intake port 10. The second discrete intake tube 53 is so arranged as to be opened or closed with a shutter valve 54 mounted at its upstream end portion. Each of the shutter valves 54L disposed in the left-hand bank portion 2L is connected with a common shaft 55L for the left-hand bank portion 2L, and each of the shutter valves 54R disposed in the right-hand bank portion 2R is connected with a common shaft 55R for the right-hand bank portion 2R. To a shaft end of each of the common shafts 55L and 55R is mounted an actuator (not shown).

A fuel supply system of the body 1 of the engine comprises an upstream injector 56 and a downstream injector 57, the upstream injector 56 being disposed immediately upstream of the supercharger 32 and the downstream injector 57 being disposed at the discrete intake tube 35 so as to face the first intake port 9 and the second intake port 10. In FIG. 3, reference numeral 58 denotes an assist air passage and reference numeral 59 denotes a check valve.

Figure 3:
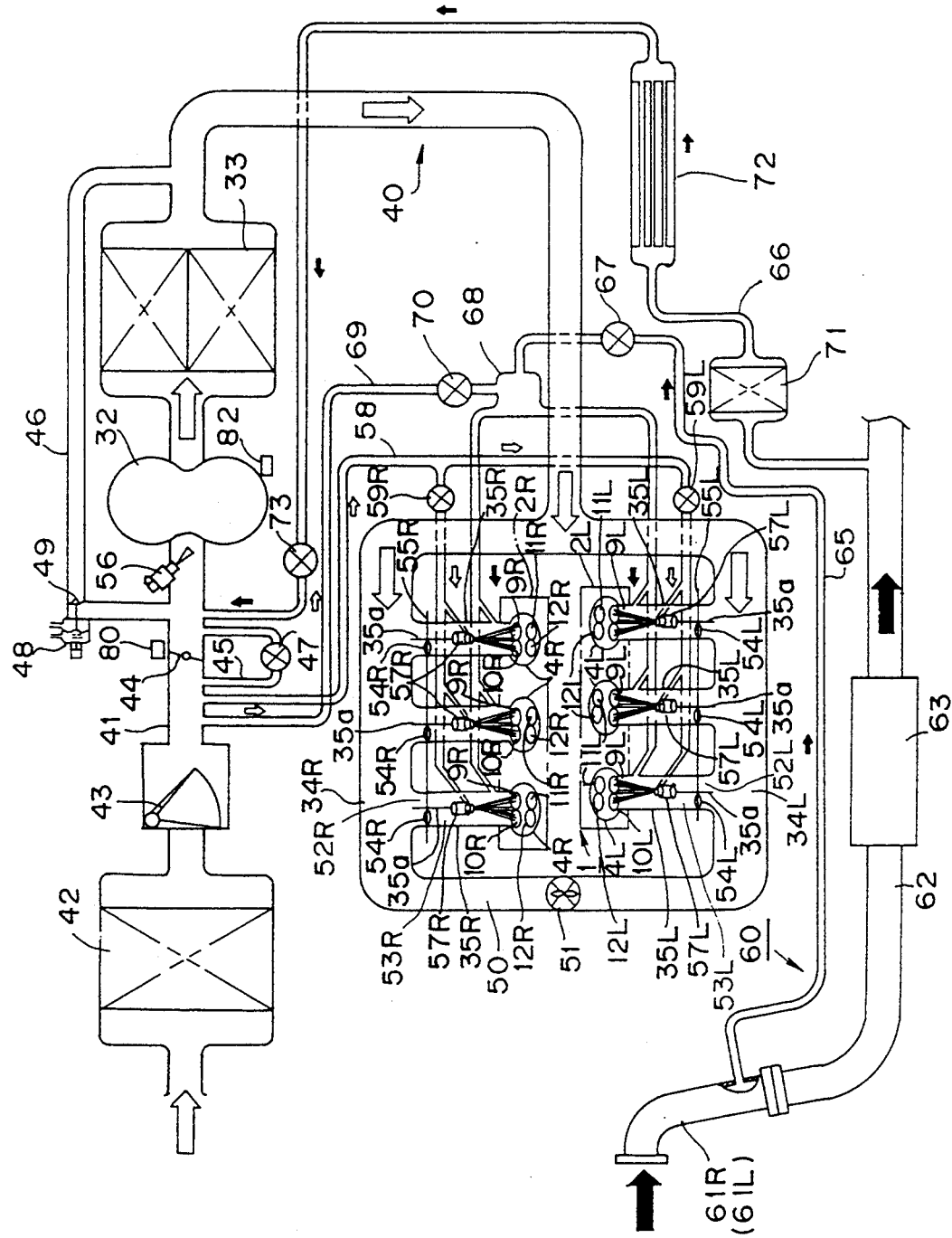
FIG. 3 is a schematic representation showing an intake system and an exhaust system of the internal combustion engine according to the present invention.

As shown in FIG. 3, an exhaust system 60 of the engine comprises a left-hand exhaust manifold 61L for the left-hand bank portion 2L, a right-hand exhaust manifold 61R for the right-hand bank portion 2R, and a common exhaust tube 62, which are disposed in this order from the upstream side toward the downstream side. The common exhaust tube 62 is provided in its intermediate position with a catalyst converter 63 for cleaning exhaust gases and at its downstream end with a silencer (not shown) in a manner as is known to the art.

The body 1 of the engine has a first outer EGR passage 65 and a second outer EGR passage 66, and a transversely sectional diameter of the first outer EGR passage 65 is smaller than that of the second outer EGR passage 66. The first outer EGR passage 65 is so adapted as to be employed in a low load region, while the second outer EGR passage 66 is so adapted as to be employed in a high load region, as will be described hereinafter.

The first outer EGR passage 65 is connected at its one end to the exhaust manifold 61L or 61R and at its other end to the first intake port 9. To the first outer EGR passage 65 are mounted a first EGR valve 67 on its one end side and a collective chamber 68 on its other end side. The collective chamber 68 is communicated with the common intake tube 41 through a bypass air tube 69 to which a bypass air control valve 70 in turn is mounted. On the other hand, one end of the second outer EGR passage 66 is connected to the common exhaust tube 62 on the side downstream of the catalyst converter 63, and the other end thereof is connected to the common intake tube 41 on the side downstream of the throttle valve 44. The second outer EGR passage 66 is provided from the one end side to the other end side with a carbon trap 71, an EGR cooler 72, and a second EGR valve 73.

Specification of Engine:

A specification of the engine is as follows:
(1) Type of engine: V-type 6-cylinder; DOHC 4-valve engine
(2) Angle between the left-hand bank portion and the right-hand bank portion: 90°
(3) Displacement: 1,496 cc
(4) Bore size of cylinder: 63 mm in diameter
(5) Stroke of piston: 80 mm
(6) Compression ratio ($\epsilon$): $\epsilon = 10$
(7) Angle between the intake valve and the exhaust valve: 30°
(8) Supercharger: Screw type (pressure ratio=2.5)
(9) Outlet temperature of intercooler: 60° C.
(10) Fuel: regular gasoline (octane value=91)

In other words, the spark ignition type reciprocating engine according to the embodiment of the present invention has the cylinder bore 5 with a small bore size and a long stroke wherein the stroke of the piston is larger with respect to the bore size. Further, the engine has a high compression ratio. In addition, the charging pressure is set to a high pressure.

Figure 4:
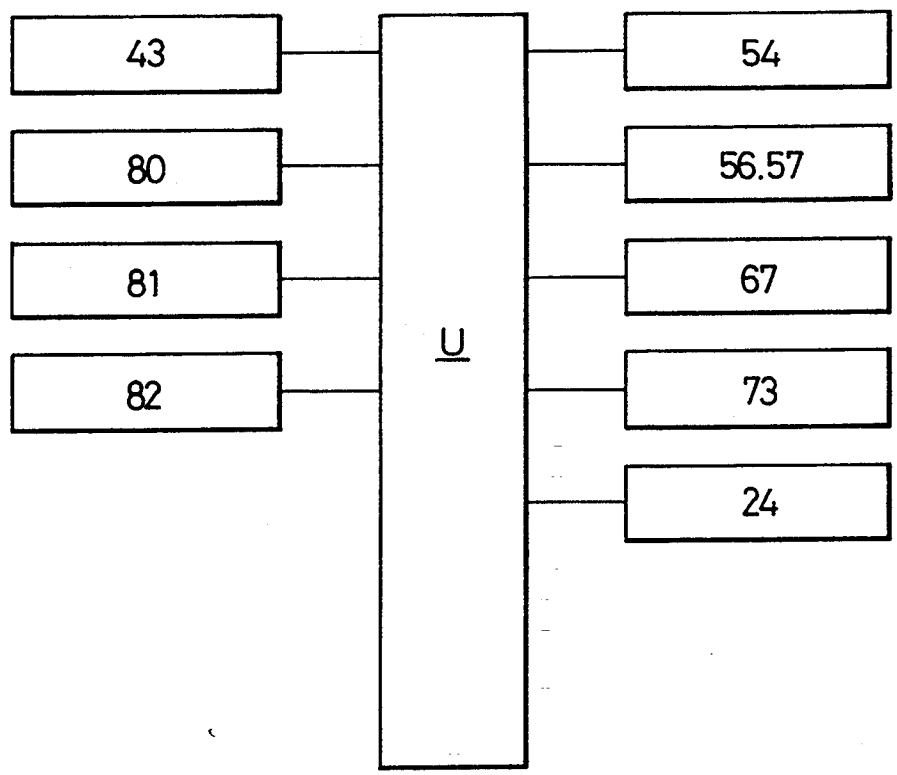
FIG. 4 is a block diagram showing a control system of the internal combustion engine according to the present invention.

The engine has a control unit U as shown in FIG. 4, and the control unit U is comprised of, for example, a microcomputer. Into the control unit U, signals are entered from the air flowmeter 43 for sensing an amount of intake air, a sensor 80 for sensing an angle of the opening of the throttle valve 44, a sensor 81 for sensing the number of rotation of the engine, and a sensor 82 for sensing the number of rotation of the supercharger 32. On the other hand, the control unit U generates control signals to the shutter valve 54, the upstream injector 56, the downstream injector 57, the first EGR valve 67, the second EGR valve 73, and the first valve timing change-over mechanism 24 for the intake valves.

Control of Shutter Valve 54:

The shutter valve 54 is so arranged as to be closed in a low rotation region where the number of rotation of the engine is lower than, for example, 3,000 rpm and opened in a high rotation region where the number of rotation of the engine is higher than, for example, 3,000 rpm. In such a low rotation region where the amount of intake air is smaller, on the one hand, the intake is performed by opening the first discrete intake tube 52 only while closing the second discrete intake tube 53. In the high rotation region where the amount of intake air becomes larger, on the other hand, the intake is performed by opening both of the first and second discrete intake tubes 52 and 53.

Figure 5:
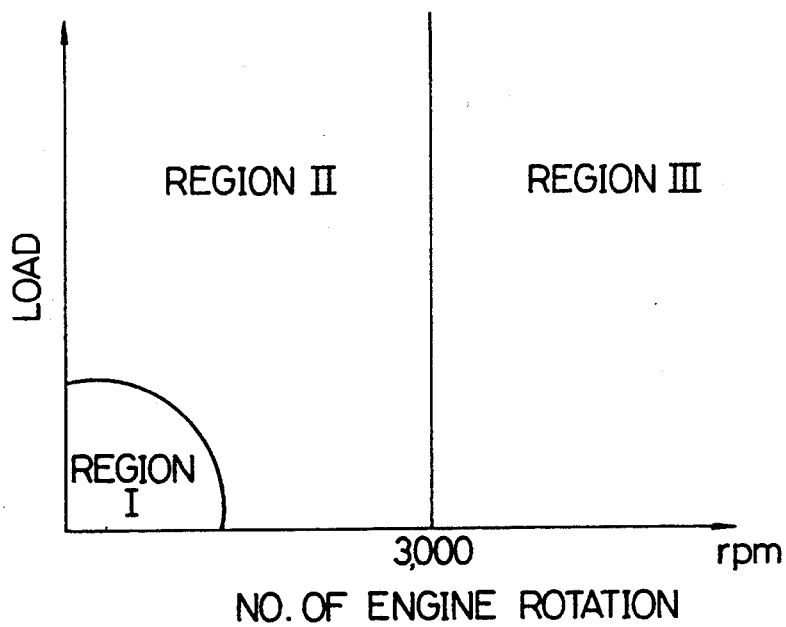
FIG. 5 is a map for controlling a shutter valve disposed in an intake passage.

Control of Valve Timing:

The valve timing for regions I, II and III will be described with reference to the map as indicated in FIG. 5.

Figure 6:
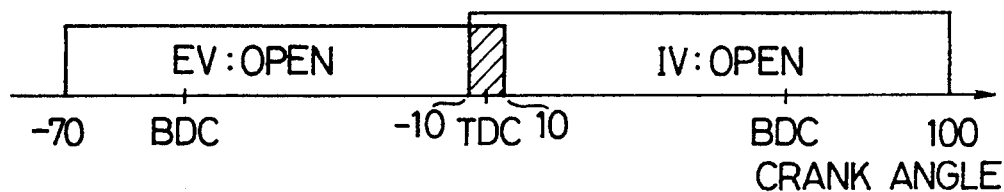
FIG. 6 is a diagram describing the action of a variable valve timing in a region I.

Region I: The region I is a region where the load of the engine is low and the number of rotation of the engine is low. As shown in FIG. 6, reference symbol "EV" denotes the exhaust valve and reference symbol "IV" denotes the intake valve (this being applied to FIGS. 7 and 8).

In this region, the valve timing for opening the exhaust valves 15 and 16 is set at 70 deg (crank angle) before the bottom dead center (BBDC) while the valve timing for closing them is set at 10 deg (crank angle) after the top dead center (ATDC); on the other hand, the valve timing for opening the intake valves 13 and 14 is set at 10 deg (crank angle) before the top dead center (BTDC) while the valve timing for closing them is set at 100 deg (crank angle) after the bottom dead center (ABDC).

Region II: This region is a region where the number of rotation of the engine is equal to or lower than 3,000 rpm.

Figure 7:
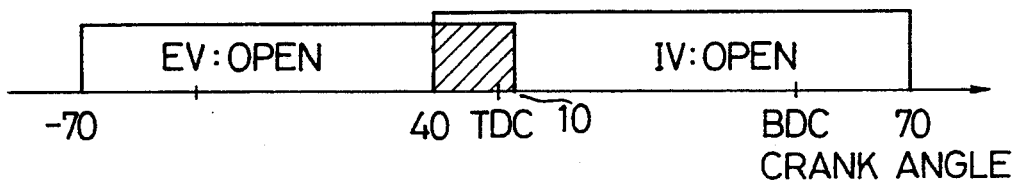
FIG. 7 is a diagram describing the action of the variable valve timing in a region II.

In the region II, as shown in FIG. 7, the valve timing for opening the exhaust valves 15 and 16 is set at 70 deg (crank angle) before the bottom dead center (BBDC) and the valve timing for closing them is set at 10 deg (crank angle) after the top dead center (ATDC). On the other hand, the valve timing for opening the intake valves 13 and 14 is set at 40 deg (crank angle) before the top dead center (BTDC) and the valve timing for closing them is set at 70 deg (crank angle) after the bottom dead center (ABDC).

Region III: This region is a region where the number of rotation of the engine is higher than 3,000 rpm.

Figure 8:
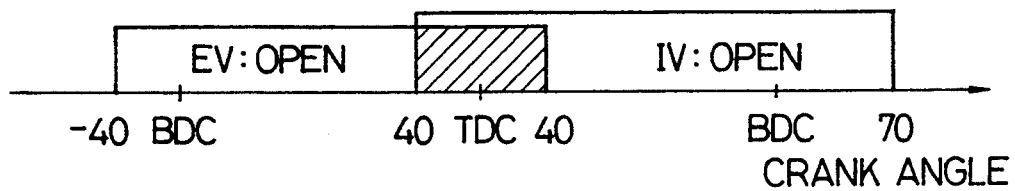
FIG. 8 is a diagram describing the action of the variable valve timing in a region III.

In the region III, as shown in FIG. 8, the valve timing for opening the exhaust valves 15 and 16 is set at 40 deg (crank angle) before the bottom dead center (BBDC) and the valve timing for closing them is set at 40 deg (crank angle) after the top dead center (ATDC). On the other hand, the valve timing for opening the intake valves 13 and 14 is set at 40 deg (crank angle) before the top dead center (BTDC) and the valve timing for closing them is set at 70 deg (crank angle) after the bottom dead center (ABDC).

In summary, the intake valves 13 and 14 are set so as to be delayed in closing in all the regions. Specifically, in the region I, an overlap of an open state of the intake valves 13 and 14 with an open state of the exhaust valves 15 and 16 is set to be smaller than any other region, and the closing of the intake valves 13 and 14 is delayed more than in any other regions; in the region II, the overlap of the open state of the intake valves 13 and 14 with the open state of the exhaust valve is set to be larger than in the region I; and in the region III, the overlap of the range of the crank angle, at which the exhaust valves 15 and 16 are open, with the range of the crank angle at which the intake valves 13 and 14 are open, is larger than any other regions.

The foregoing description can be briefed as follows:
(1) Region I (with the low load of the engine and the low number of rotation of the engine): the overlap is smaller than in any other regions and the closing of the intake valves is delayed at an extremely late time.
(2) Region II (with the number of revolutions of the engine equal to or smaller than 3,000 rpm): the overlap is larger than in the region I yet smaller than in the region III, and the closing of the intake valves is delayed.
(3) Region III (with the number of revolutions of the engine larger than 3,000 rpm): the overlap is larger than in any other regions and the timing of closing the intake valves is delayed.

Figure 9:
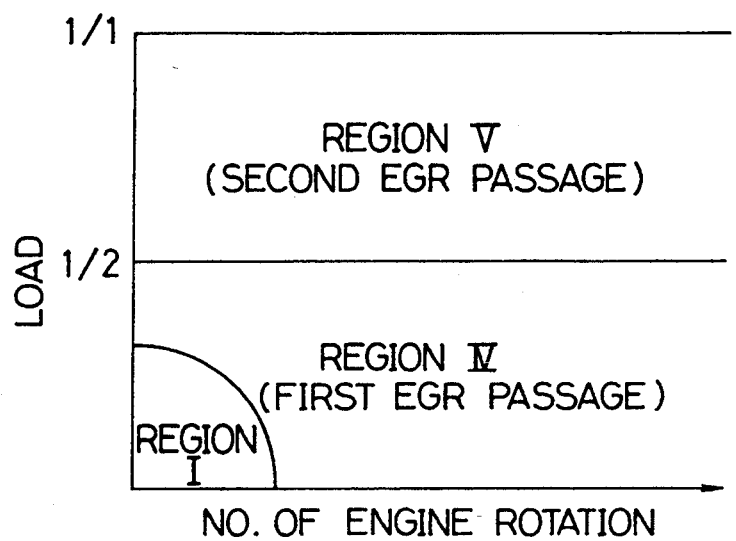
FIG. 9 is a control map for exhaust gas recirculation (EGR).

Control of EGR:

The control of the recirculation of exhaust gases (EGR) is performed in three regions, i.e. region I, IV, and V, on the basis of the map as indicated in FIG. 9 by controlling the first EGR valve 67 and the second EGR valve 73 in a fashion as will be described hereinafter.

Region I: This region is a region wherein the load of the engine is low and the number of rotation of the engine is low, as have been described hereinabove.

In this region I, both of the first and second EGR valves 67 and 73 are closed.

Region IV: This region is a region wherein the throttle valve 44 is opened at an angle of a half or smaller.

In the region IV, a rate of the EGR is adjusted by the first EGR valve 67 while the second EGR valve 73 is closed. In other words, exhaust gases are recirculated through the first outer EGR passage 65.

Region V: This region is a region in which the throttle valve 44 is open at an angle larger than a half of the entire opening angle and the charging region contains the full range up to the total amount of the load.

In the region V, a rate of the EGR is adjusted by the second EGR valve 73 while the first EGR valve 67 is closed. In other words, exhaust gases are recirculated by the aid of the second outer EGR passage 72 with the EGR cooler 72. Further, in this region, the rate of the EGR is so arranged as to be constant or to be increased as the load becomes larger.

Figure 10:
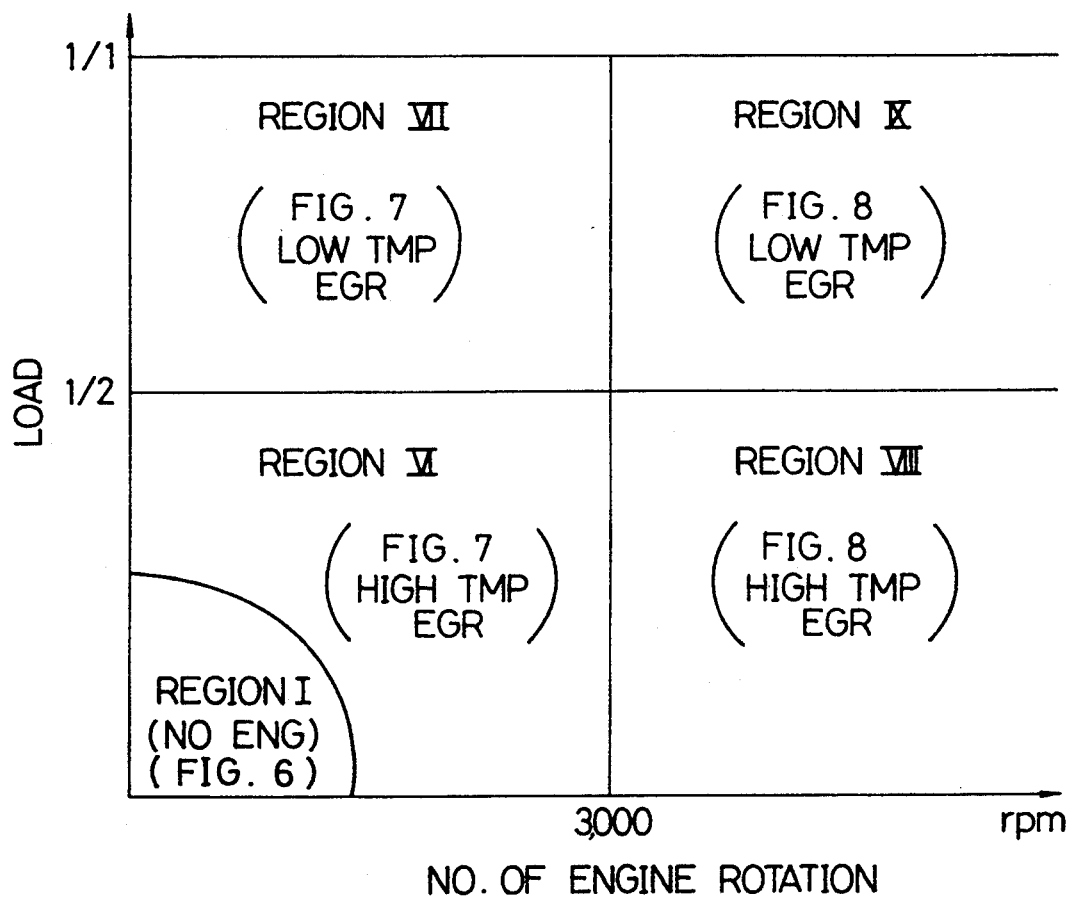
FIG. 10 is a control map for performing the control of the shutter valve and the control of the EGR.
Figure 11:
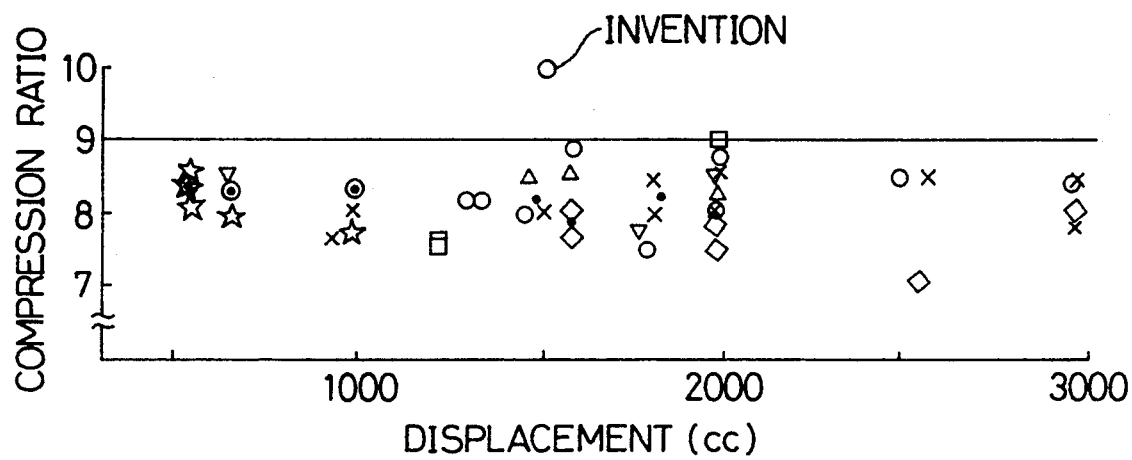
FIG. 11 is a diagram showing a comparison between the internal combustion engine according to the embodiment of the present invention and the conventional engine on the basis of the compression ratio vs. displacement.
Figure 12:
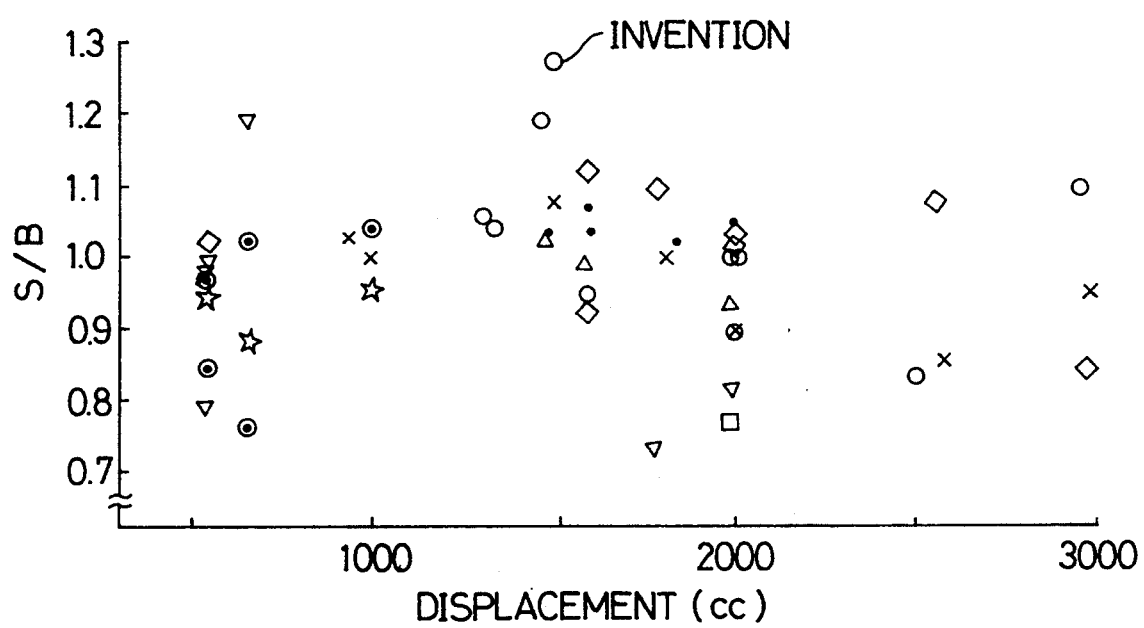
FIG. 12 is a diagram showing a comparison between the internal combustion engine according to the embodiment of the present invention and the conventional engine on the basis of the S/B ratio vs. displacement.
Figure 13:
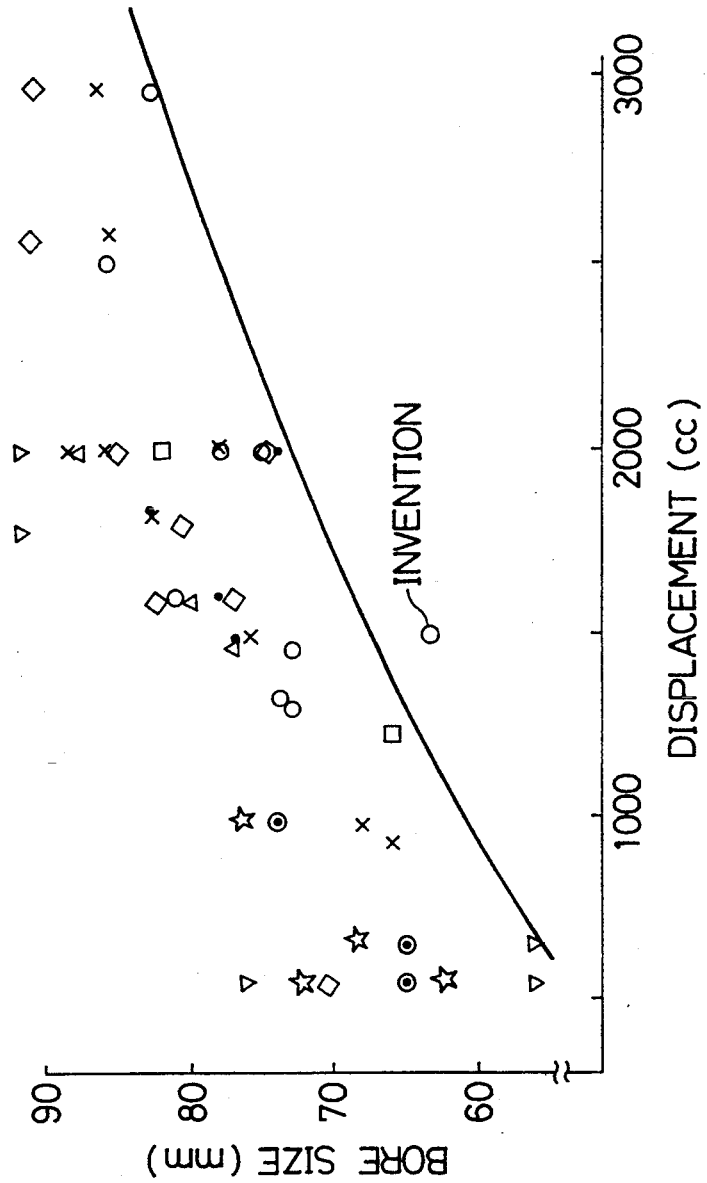
FIG. 13 is a diagram showing a comparison between the internal combustion engine according to the embodiment of the present invention and the conventional engine on the basis of the bore size of the cylinder vs. displacement.
Figure 14:
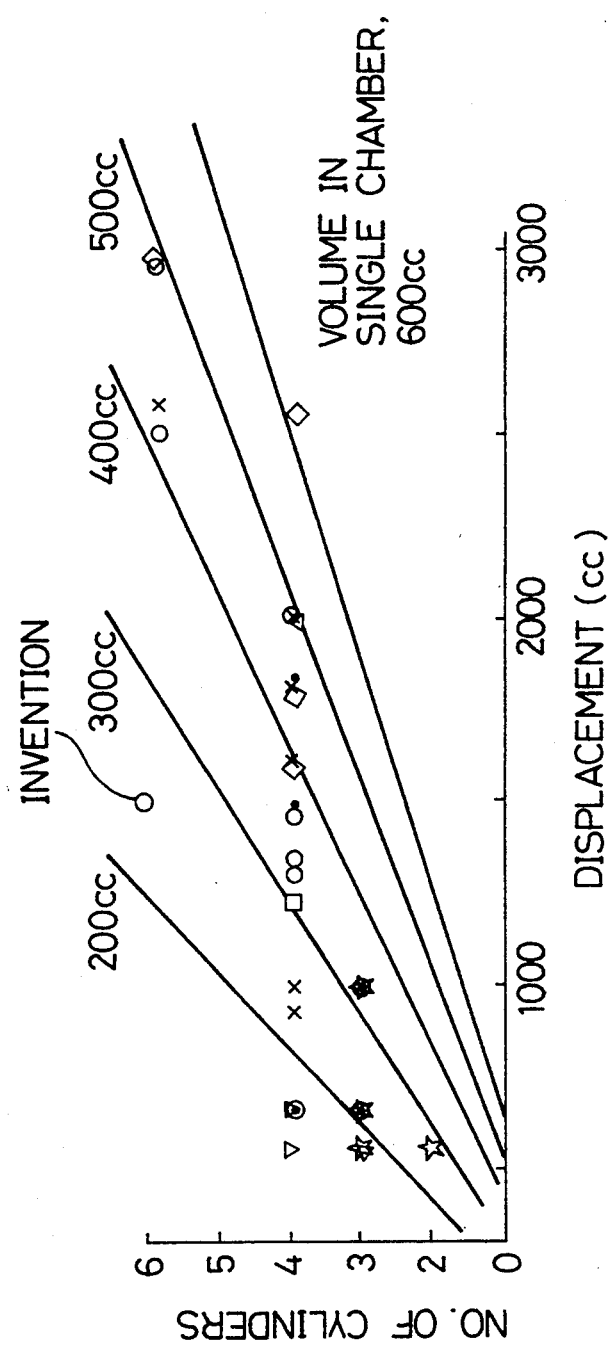
FIG. 14 is a diagram showing a comparison between the internal combustion engine according to the embodiment of the present invention and the conventional engine on the basis of the number of cylinders vs. displacement.

It is to be noted that FIG. 10 is prepared by a combination of FIG. 5 indicative of the control of the valve timing with FIG. 9 indicative of the control of the EGR. In FIG. 10, the region is divided into four regions, I, VI, VII, VIII and IX. A detailed description will be made of the regions I, VI and VII, where the problems arise with stability in combustion, fuel economy or knocking. The engine is controlled in these regions in such a manner as will be described hereinafter.

Region I: This region is a region in which the load is extremely light, that is, the load is low and the number of rotation of the engine is low, as described hereinabove. In the region I, combustion is likely to become unstable.

In this region, an outer EGR via the outer EGR passages is inhibited and there is a smaller overlap between the crank angle at which the exhaust valves 15 and 16 are open and the crank angle at which the intake valves 13 and 14 are open. Hence, the amount of gases which are left in the combustion chamber 8 is so small that the stability in combustion can be ensured. Further, as the angle at which the throttle valve 44 is open is small in the region I, the closing of the intake valves 13 and 14 is delayed to an extremely late extent, so that a loss in pumping can be reduced.

Region VI: This region is a region where the load is light, or the load of the engine is low and the number of revolutions of the engine is low.

In the region VI where the number of rotation of the engine is equal to or smaller than 3,000 rpm and the load of the engine is equal to or lower than a half of the total load, the combustion is relatively stable. The overlap of the crank angle at which the exhaust valves 15 and 16 are open with the crank angle at which the intake valves 13 and 14 are open is set to be larger, so that an internal EGR is performed in addition to the recirculation of exhaust gases from the first outer EGR passage 65. In other words, in the region VI, as the overlap of the range in which the exhaust valves 15 and 16 are open with the range in which the intake valves 13 and 14 are open is large, the internal EGR is carried out by causing a large amount of gases to be remained in the combustion chamber 8. The exhaust gases to be remained in the combustion chamber 8 for the internal EGR are high in temperature. Further, the exhaust gases to be recirculated through the first outer EGR passage 65 are relatively high in temperature because the exhaust gases withdrawn from the engine are recirculated to the engine through the first outer EGR passage 65 whose upstream end is communicated with the exhaust manifold 61, before they are allowed to become cool.

In addition, the closing of the intake valves 13 and 14 is delayed, so that the delay in closing them in combination with the recirculation of the exhaust gases having higher temperature can reduce a loss in pumping in the region VI.

Region VII: This region contains the whole region of the load of the engine higher than two one-half of the total amount of the load thereof.

In the region VII where the number of revolutions of the engine is higher than 3,000 rpm and the throttle valve 44 is opened at an angle larger than a half. Further, in this region, the pressure is charged. The overlap of the range of the crank angles at which the exhaust valves 15 and 16 are open with the range of the crank angles at which the intake valves 13 and 14 are open is larger than in any other regions, so that the scavenging of the combustion chamber 8 can be enhanced, and the elevation of the temperature within the cylinder (the temperature within the cylinders 4) by the internal EGR can be suppressed. Further, the timing of closing the intake valves is so delayed that the effective stroke of the piston 6 in the stroke of compression can be shortened, thereby suppressing the temperature of the exhaust gases within the cylinder associated with compression of the intake air from elevating. In addition, in the region VII, the exhaust gases are allowed to cool with the second outer EGR passage 66 with the EGR cooler 72 and then recirculated, i.e. a so-called cold EGR is performed, thereby suppressing the temperature within the cylinder from elevating.

It can be noted further that an upstream end of the second outer EGR passage 66 is connected on the downstream side of the exhaust system 60, so that the exhaust gases cooled by the exhaust system 60 can be introduced into the second outer EGR passage 66. On the other hand, as a downstream end of the second outer EGR passage 66 is connected on the upstream side of the intercooler 33, the exhaust gases are allowed to cool again with the intercooler 33 after they have been recirculated through the second outer EGR passage 66 to the intake system 40. From the foregoing, an outer EGR to be performed through the second outer EGR passage 66 can further lower the temperature of the exhaust gases.

In the region VII, the temperature within the cylinder can be lowered in the way as described hereinabove by means of scavenging, delaying the closing of the intake valves 13 and 14, and the cold EGR, so that an occurrence of knocking can be suppressed and the amount of NOx within the exhaust gases can be decreased in the region VII.

Control of Air-Fuel Ratio:

The engine according to the present invention is subjected to feed-back control so as for the air-fuel ratio to become a stoichiometric air-fuel ratio ($\lambda=1$) in a wide range containing the charging region VII. A description of the feed-back control will be omitted herefrom because it is well known to the art. It can further be noted that the air-fuel ratio may be set to 12–13, as in conventional cases, in a region where the charging pressure is relatively low and the load of the engine is high.

Figure 15:
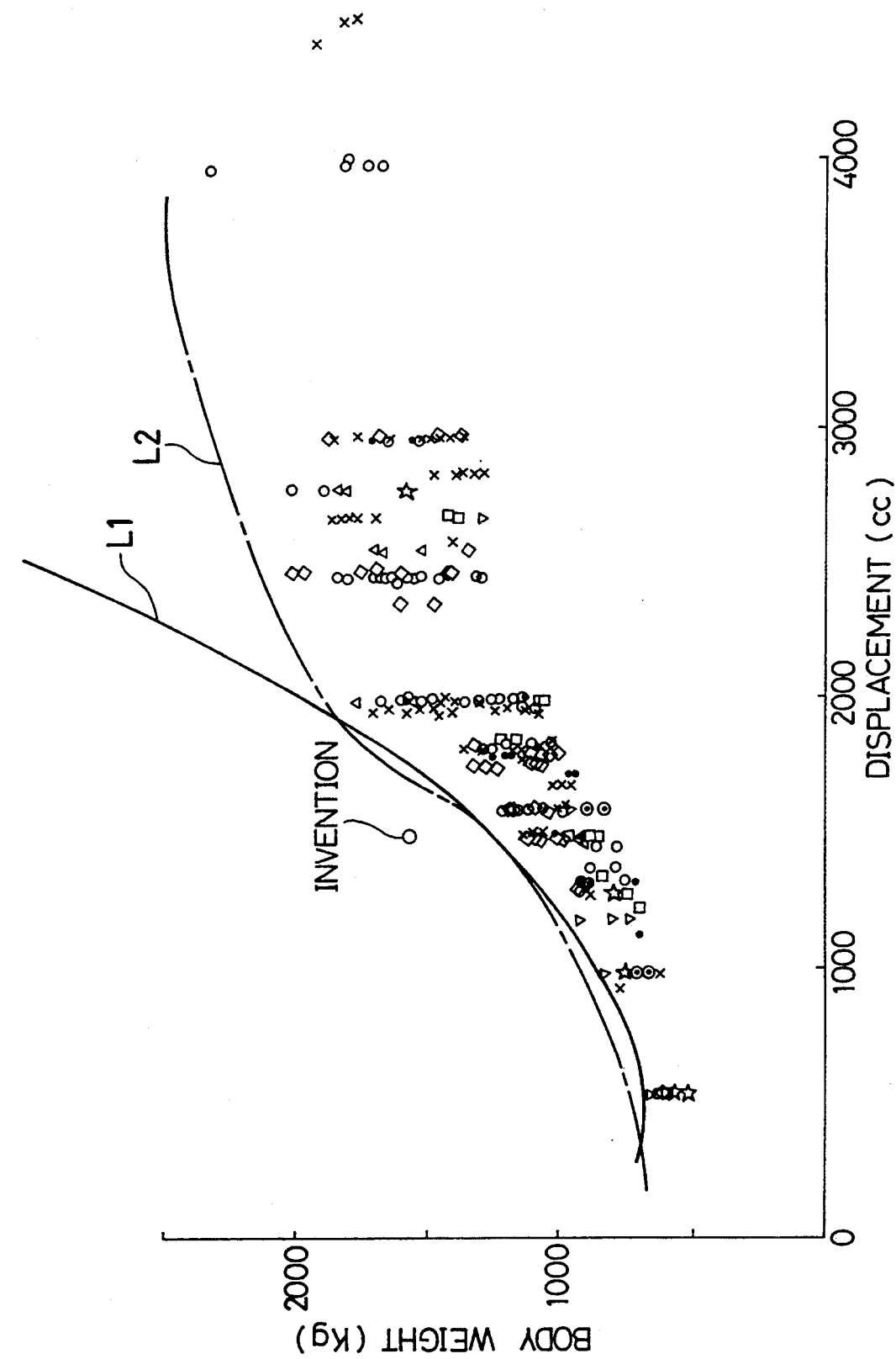
FIG. 15 is a diagram showing a comparison between the internal combustion engine according to the embodiment of the present invention and the conventional engine on the basis of the weight of a body of the vehicle vs. displacement.

It is to be noted that FIGS. 11 to 14 indicate each a comparison of the characteristic increase of the engine according to the present invention and conventional ones. As is apparent from FIG. 11, it is found that the engine according to the present invention has a higher compression ratio than conventional ones; it is found from FIG. 12 that a stroke is longer than the conventional ones; it is found from FIG. 13 that the bore size is small with respect to the displacement; and it is further found from FIG. 14 that the number of cylinders is large with respect to the displacement. Referring further to FIG. 15, the body of the vehicle on which the body 1 of the engine is loaded weighs approximately 1,500 kg, and it is found from the relationship of the weight of the body of the vehicle with the displacement that this weight of the body of the vehicle corresponds to the weight of a conventional vehicle on which an engine having a displacement of 3,000 cc can be loaded. In other words, the engine according to the present invention can produce output larger by twice the conventional engines by charging the high pressure. More specifically, a 1.5-liter engine can produce an output that is equal to or corresponds to a 3.0-liter engine.

It can be noted herein that the reference line L1 in FIG. 15 can be represented by the formula (5) as follows:

$$W = 543.3 \left[\frac{V}{1000}\right]^2 - 508.8 \left[\frac{V}{1000}\right] + 815$$

where

W is the weight of the body of the vehicle; and
V is the displacement.

Further, the reference line L2 of FIG. 15 can be represented by the formula (6) as follows:

$$\frac{W}{1000} = 1.534 \left[\frac{V}{1000}\right]^3 - 6.834 \left[\frac{V}{1000}\right]^2 + 10.792 \left[\frac{V}{1000}\right] - \frac{4.332}{1000}$$

where

W and V has the same meaning as above.

Hence, the engine according to the present invention having the characteristics as described hereinabove can improve the fuel economy by making the displacement smaller and, at the same time, achieve improvements in heat efficiency and fuel economy by making the compression ratio higher. Further, the engine according to the present invention having the longer stroke can reduce a burden imposed upon the bearing units, thereby reducing a mechanical loss. In addition, the engine with multiple cylinders according to the present invention can make an internal combustion engine with less vibration.

Figure 16:
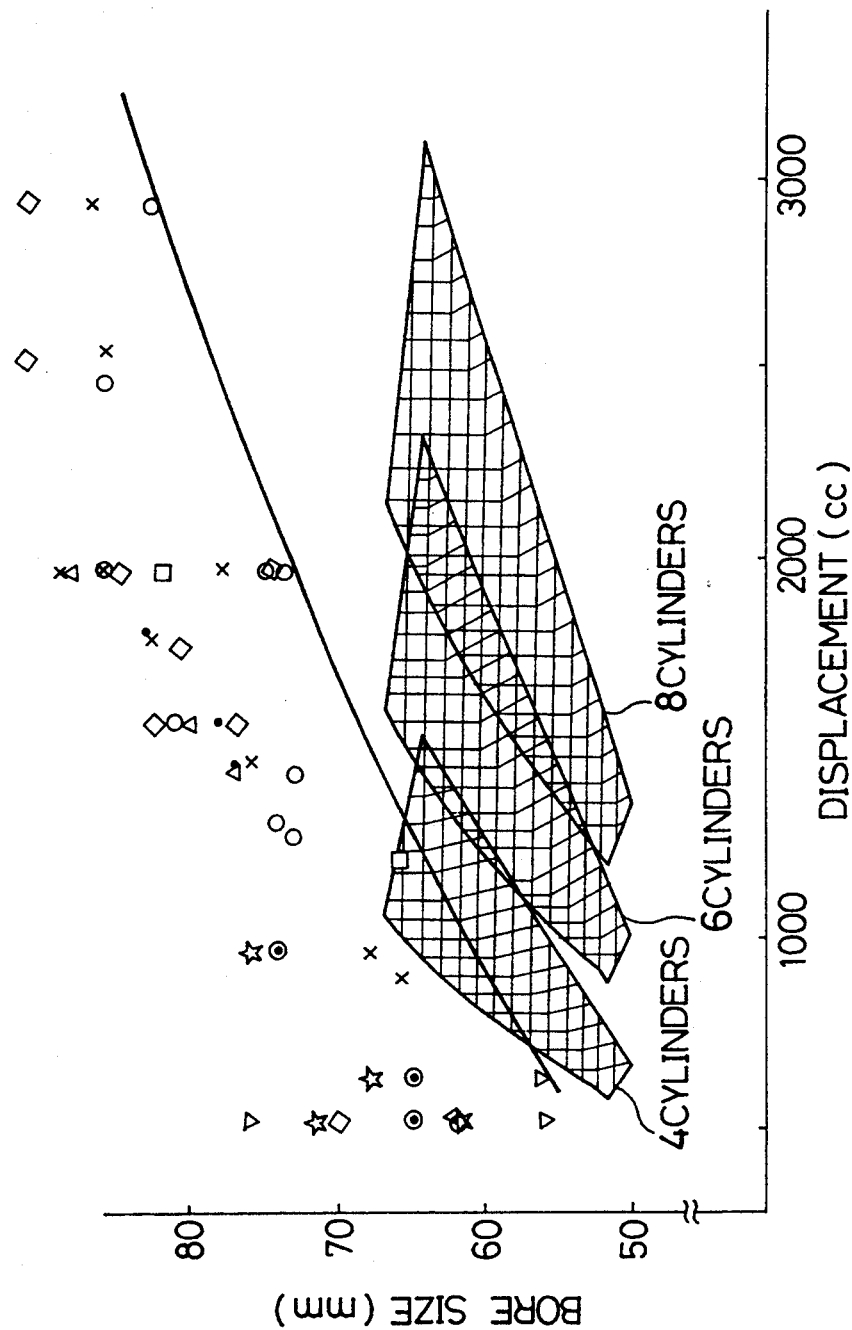
FIG. 16 is a diagram showing a comparison of the number of cylinders between the internal combustion engine with two intake valves and two exhaust valves for each cylinder according to the embodiment of the present invention and the conventional engine on the basis of the bore size vs. displacement

In addition, it is to be noted that the engine according to the present invention can provide a variety of internal combustion engines with the number of cylinders varied without alteration of the configuration of each one of the cylinders. FIG. 16 indicates a comparison of the engines with four, six and eight cylinders with conventional engines.

Furthermore, as have been described hereinabove, for example, the output equal to from 1.5-liter engine to 3-liter engine can be gained at the conventional engine output by changing the charging pressure. In other words, for example, four kinds of engines, such as 1.5-liter engine, 2-liter engine, 2.5-liter engine, and 3-liter engine, can be prepared by setting different charging pressures for the body 1 of the engine according to the present invention.

Given the displacement for each cylinder of the body 1 of the engine being set to approximately 250 cc, the engine design for, for example, 1.5-liter engines, 2-liter engines, 2.5-liter engines, 3-liter engines, 3.5-liter engines, and 4-liter engines, can be simplified to a great extent; steps of development of engines can be reduced to a large extent; and a large number of instruments for the preparation of engines can be used for manufacturing different types and models of engines.

In other words, by uniforming the bore sizes, strokes of pistons, pitches of bores, height of cylinder heads, a pattern of a bolt for the cylinder head, and the like, the installation and equipments for manufacturing engines can readily be employed for preparing V-type engines having different angles of sectionally V-shaped banks or having the different number of cylinders. If the bore sizes and the strokes of the pistons are uniformed so as to be identical to each other, activities of development can place its focus on the single chamber, for example, having the displacement of approximately 250 cc as a basic unit because the engines should have substantially the same characteristics. As a result of accummulation of technologies gained by concentrated activities of development of the single chamber, engines having different displacement or having the different number of cylinders or engines of different types having an in-line or V-type arrangement of cylinders or engines having different angles of sectional V-shaped bank portions can be developed with remarkably reduced steps of development.

For the body 1 of the engine according to the present invention, the shutter valve 54 is disposed apart from the second intake port 10 so that the scavenging of the exhaust gases can provide effects as will be described hereinafter. In other words, in the region VII as indicated in FIG. 10, wherein the number of rotation of the engine is low and the load of the engine is high, the shutter valve 54 is closed in such a manner that some extent of leaks of the exhaust gases is allowed without tightly closing the second discrete intake passage 53.

Hence, in the region VII, fresh air charged into the second discrete intake passage 53 and the second intake port 10 at a higher charging pressure is accumulated therein, and the fresh air having its pressure accumulated therein is allowed to enter into the combustion chamber 8, thereby causing the fresh air to forcibly scavenge the already burned gases around the second intake port 10.

For the engine according to the present invention, the temperature within the cylinder may be lowered by injecting water into the combustion chamber 8 in the high load region in order to further prevent the knocking from occurring in the high load region. The lower the temperature within the cylinder the more completely the knocking can be prevented, that is, the more difficult it is to cause the knocking to occur, and the higher the charging pressure or the compression ratio can be made.

Figure 17:
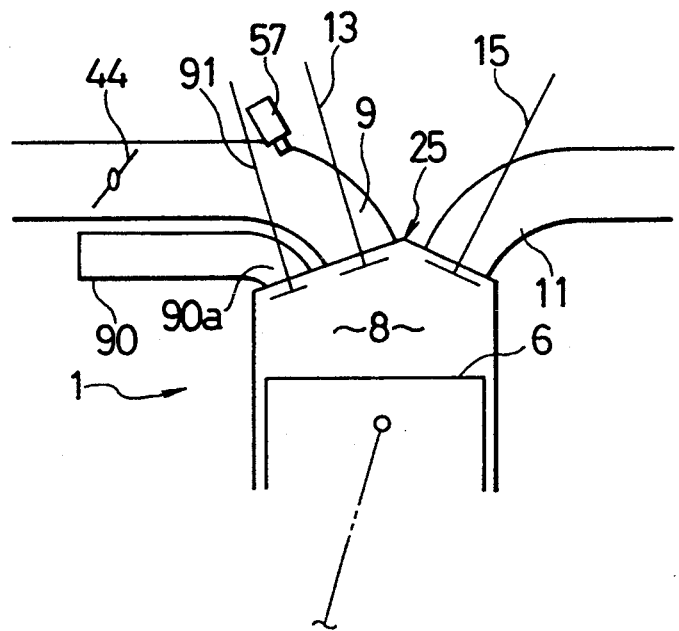
FIG. 17 is a schematic representation showing an internal combustion engine with a sub-chamber according to a variant of the embodiment of the present invention.

Further, a sub-chamber 90 may be disposed in the body 1 of the engine as a means for preventing an occurrence of knocking, as shown in FIG. 17. In FIG. 17, the same elements are provided with the same reference numerals as those shown in FIG. 1 and other drawings and a description of those elements will be omitted from the explanation which follows.

Engine with Sub-chamber (FIG. 17):

The sub-chamber 90 disposed in the body 1 of the engine is provided with a sub-chamber port 90a having an opening in the combustion chamber 8, and a sub-chamber valve 91 is mounted at the sub-chamber port 90a. In the high load region (as indicated by the region V in FIG. 9), the sub-chamber port 90a is so arranged as to be opened or closed with the sub-chamber valve 91. On the other hand, in the low load region (as indicated by the regions I and IV in FIG. 9), the sub-chamber port 90a is so arranged as to be closed with the sub-chamber valve 91.

Figure 18:
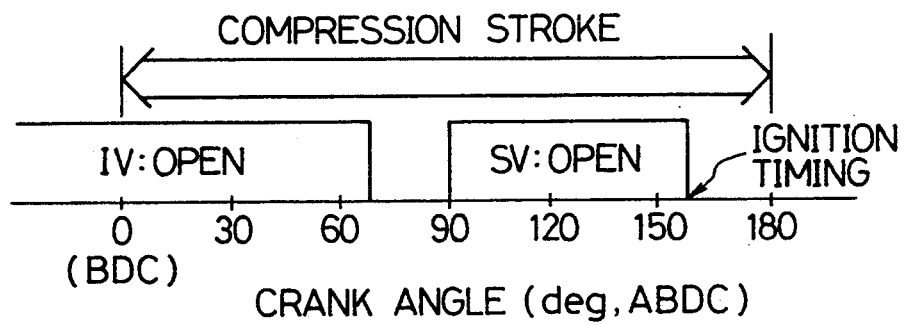
FIG. 18 is a diagram showing the timing for opening and closing a sub-chamber valve of the internal combustion engine with the sub-chamber.

FIG. 18 shows an example of the timing of opening and closing the sub-chamber port 90a with the sub-chamber valve 91 in the high load region.

As is apparent from FIG. 18, the timing of closing the sub-chamber port 90a with the sub-chamber valve 91 is the same as the timing of ignition, i.e. 160 deg after the bottom dead center (ABDC), and the sub-chamber port 90a is opened at approximately 70 deg before that closing timing, thereby allowing the mixed air within the sub-chamber 90 to be replaced with the mixed air within the combustion chamber 8.

It can further be noted that the timing of opening the sub-chamber valve 91 may preferably be in the process of the stroke of compression, particularly in the middle stage, and the timing of closing it may preferably be substantially the same as or somewhat earlier than the timing of ignition, although the timing of closing the sub-chamber valve 91 may be set in the initial stage of the stroke of explosion. Further, the volume of the sub-chamber 90 may be set to be from approximately 20% to 50% of the volume of the combustion chamber at the top dead center, and the area of the sub-chamber valve 91 may be set to be from approximately 20% to 30% of the area of the intake valve.

The arrangement for the engine as have been described hereinabove allows a portion of the mixed fuel within the combustion chamber 8 to be closed in the sub-chamber 90 with the sub-chamber valve 91 so disposed as to be opened or closed during the stroke of compression, and the portion of the mixed fuel is then cooled in the sub-chamber 90 and then replaced with a portion of the mixed fuel within the combustion chamber 8 during the stroke of compression which follows, thereby lowering the temperature within the cylinder in the high load region to a level lower than that of the conventional engines With no sub-chamber equipped therewith and suppressing the knocking from occurring.

An internal combustion engine is so designed as to translate an increase in pressure (a rate of elevation of the pressure within the cylinder, $\Delta P$) associated with the combustion of the fuel fed to its combustion chamber into mechanical work. Hence, the internal combustion engine can do better work as the rate of elevation of the pressure within the cylinder, $\Delta P$, becomes larger. Given the combustion at a constant volume, the rate of elevation of the pressure within the cylinder, $\Delta P$, can be represented by the formula (1) as follows:

$$\Delta P = (\epsilon R/V) \times (Q/Cv) \quad (1)$$

where
- $\epsilon$ is the compression ratio;
- R is the gas constant;
- Q is the heat capacity of fuel;
- V is the volume of the combustion chamber; and
- Cv is the specific heat at a constant volume.

A review will now be made of an impact of changes in temperature upon the rate of elevation of the pressure within the cylinder, $\Delta P$. Differentiation of the formula (1) above gives the formula (2) as follows:

$$d(\Delta P)/dT = -(\epsilon R/V) \times (Q/Cv^2) \times (dCv/dT) \quad (2)$$

It can be noted herein that the specific heat at a constant volume, Cv, becomes larger as the temperature is made higher, as indicated in FIG. 17. Hence, the expression, (dCv/dT), of the right side of the formula (2) above is larger than 0 (zero) so that the right side of the formula (2) above gives a negative value.

Hence, the expression, $d(\Delta P)/dT$, of the left side of the formula (2) above gives a negative value; in other words, the higher the temperature within the cylinder the smaller the rate of elevation of the pressure within the cylinder, $\Delta P$. This means that the lower the temperature within the cylinder, the higher the rate of elevation of the pressure within the cylinder, $\Delta P$, and the better job the engine can do.

The fact that the engine can do better work as the temperature within the cylinder becomes lower may be described from another point of view.

The heat capacity Q of fuel can be represented by the formula (3) as follows:

$$Q = Cv \times G \times \Delta T \quad (3)$$

where
- Cv is the specific heat at a constant volume;
- G is the mass of the mixed fuel charged into the combustion chamber; and
- $\Delta T$ is the rate of elevation of temperature associated with combustion (the rate of elevation of the temperature within the cylinder).

The formula (3) above can be modified into the formula (4) as follows:

$$\Delta T = Q/(Cv \times G) \quad (4)$$

As is understood from the formula (4) above, the rate of elevation of the temperature, $\Delta T$, becomes higher as the specific heat at a constant volume, Cv, is made smaller, provided that the heat capacity of the fuel, Q, and the mass of the mixed fuel charged into the combustion chamber are set constant.

Figure 19:
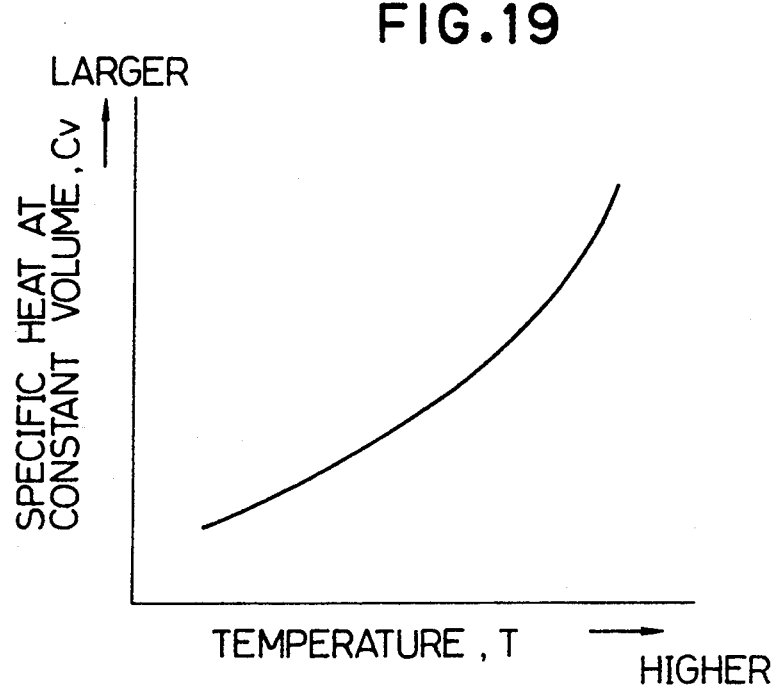
FIG. 19 is a graph showing the relation of temperatures vs. the specific heat at constant volume.
Figure 20:
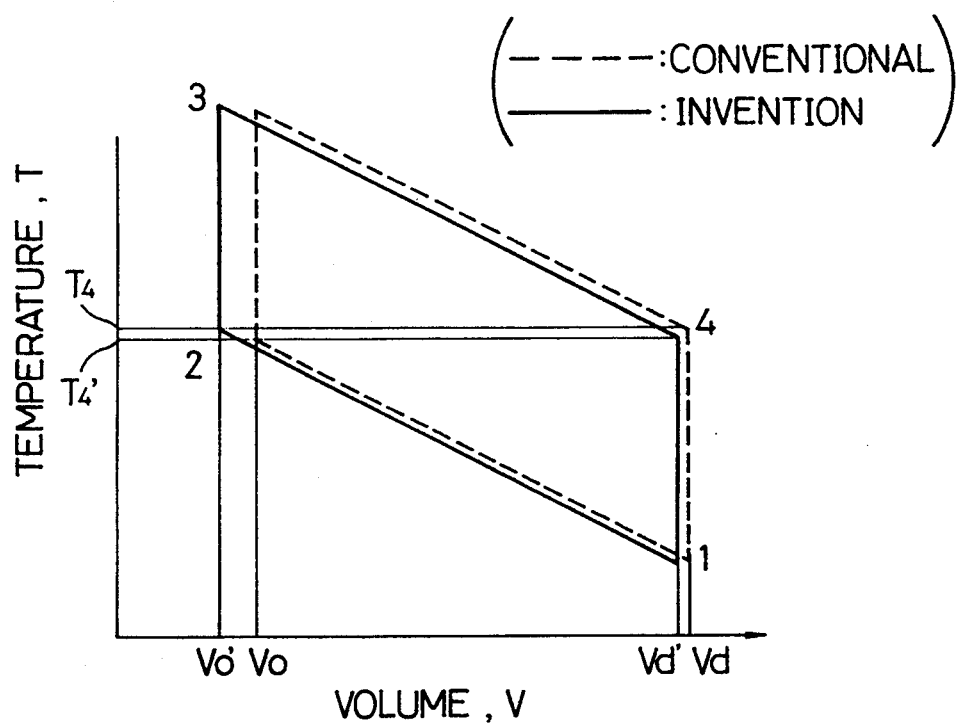
FIG. 20 is a diagram showing cycle lines of the engine according to the present invention, where the compression ratio is elevated, as compared with the conventional engine.
Figure 21:
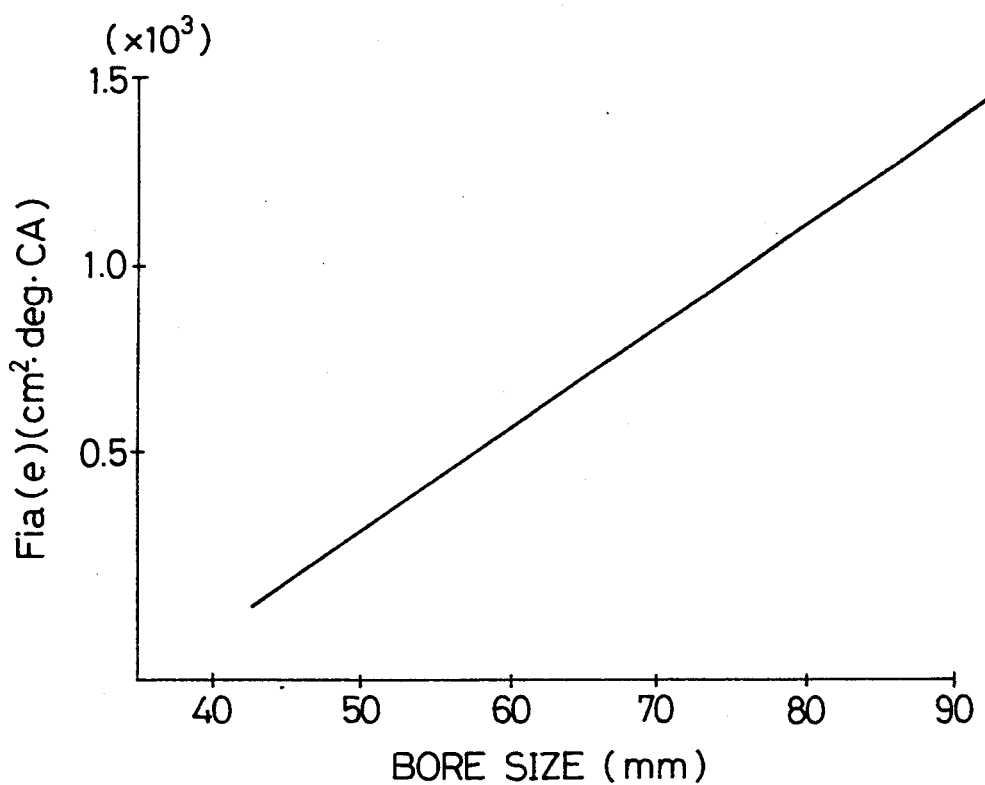
FIG. 21 is a graph showing the relation (the result of computation) between the bore sizes vs. the effective angular area of the intake valve, Fia(e).
Figure 22:
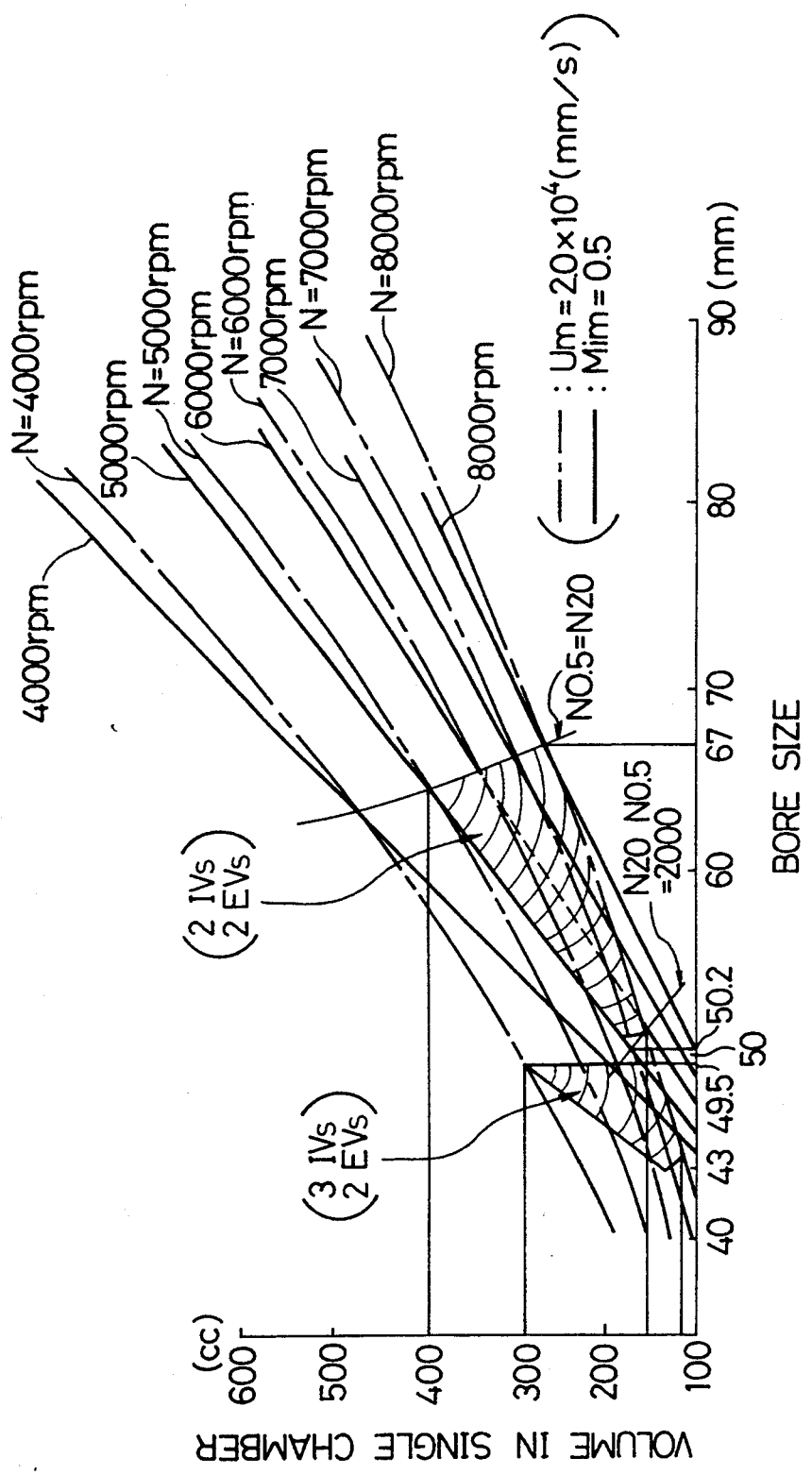
FIG. 22 is a diagram showing the relation between the bore sizes and the volumes of the single chamber, suitable for the spark ignition type reciprocating engine according to the present invention.

It can be noted that the specific heat at a constant volume, Cv, becomes larger as the temperature T is made higher, as shown in FIG. 19. In other words, the lower the temperature within the cylinder, T, the smaller the specific heat at a constant volume, Cv; hence, the lower the temperature within the cylinder, T, the higher the rate of elevation of the temperature within the cylinder, $\Delta T$, associated with the combustion.

Since the pressure within the cylinder is caused to be raised at a larger rate of elevation of the pressure within the cylinder, $\Delta P$, as the rate of elevation of the temperature within the cylinder, $\Delta T$, becomes higher, the rate of elevation of the pressure within the cylinder, $\Delta P$, becomes larger as the temperature within the cylinder, T, is lower. In other words, if the same amount of the heat capacity would be created by the same amount of fuel charged, it can be noted that, as the temperature within the cylinder, T, is made lower, the rate of elevation of the pressure within the cylinder, $\Delta P$, becomes higher, thereby doing better work and giving better heat efficiency.

As will be apparent from the foregoing description, the provision of the sub-chamber 90 in the body 1 of the engine permits the knocking to be suppressed from occurring in the high load region as well as improves the heat efficiency in the high load region.

When the elevation of the temperature associated with the compression of the mixed fuel within the combustion chamber is to be utilized to the maximum extent, the timing of closing the sub-chamber valve 91 is set to be at the top dead center of compression. Alternatively, when the elevation of the pressure associated with the combustion is to be utilized to the maximum extent, the timing of closing the sub-chamber valve 91 is set as late as possible. It can be noted herein that the angle of the crank at which the pressure associated with the combustion reaches the maximum is generally at approximately 30 deg after the top dead center of compression (ATDC).

It is generally known that actual states of combustion vary largely with cycles. If the sub-chamber valve 91 would be kept open until a deviation of the pressures within the cylinder becomes large, it is undesirable that the pressure, the density, and the temperature of the mixed fuel enclosed within the sub-chamber 90 may vary in each of cycles. Hence, if the sub-chamber valve 91 would be closed immediately before the occurrence of the deviation in the elevation of the pressure associated with the combustion, the impact of the deviation in the combustion can be suppressed, and the effect of cooling the mixed fuel can be improved. On the other hand, the sub-chamber valve 91 may be closed at the timing close to the timing of ignition, as in this embodiment, in order to undergo no impact of the deviation in the pressure associated with the combustion.

Variant of Engine with Sub-chamber:

The knocking is unlikely to occur as the load of the engine becomes lighter (in the light load region). If the heat efficiency is to be improved in the light load region by lowering the temperature within the cylinder, however, the valve timing of opening and closing the sub-chamber valve 91 may be conveniently changed by the aid of the valve timing change-over mechanism in such a manner that the valve timing of opening and closing the sub-chamber valve 91 is set so as to approach the valve timing of closing the intake valves 13 and 14 in accordance with the load as the load becomes smaller. This arrangement can suppress the loss of the pressure associated with the introduction of the mixed fuel into the sub-chamber 90 to a minimum extent and it can improve the heat efficiency due to a decrease in the temperature within the cylinder.

As a means for forcibly lowering the temperature of the mixed fuel within the sub-chamber 90, a movable piston may be mounted within the sub-chamber 90, which is so arranged as to displace within the sub-chamber 90 in synchronization with the rotation of the crank shaft 23, thereby causing the mixed fuel to flow in the sub-chamber 90. Alternatively, the movable piston may be so biased with a spring as to forcibly cause the substantial volume of the sub-chamber 90 to be made smaller, when the sub-chamber valve 91 is opened, thereby causing the mixed fuel passing through the sub-chamber port 90a to flow or move.

Other Means for Preventing Knocking (Lean Burn):

For a lean-burn engine wherein the air-fuel ratio is leaner than the stoichiometric air-fuel ratio, a portion of the heat capacity produced by the combustion is absorbed by a surplus of the air, thereby lowering the temperature within the cylinder, T. The leaner the air-fuel ratio, the larger the surplus amount of the air. This makes the temperature within the cylinder, T, lower, thereby making the knocking unlikely to occur and improving the heat efficiency. Further, actually, the reduction of the temperature within the cylinder reduces the transmission of heat to the wall surface of the combustion chamber and it can decrease the loss in cooling. Hence, the leaner air-fuel ratio can reduce the loss in cooling and as a result it can improve the heat efficiency.

For example, even if the air-fuel ratio would be set to an extremely lean ratio such as A/F=30, ignitability and combustibility can be ensured by making the intake port 9 in a swirl port or in a tumble port or by making the compression ratio larger in accordance with the lean extent of the air-fuel ratio or by igniting at multiple points.

Although the region in which the engine is running in a lean air-fuel ratio may be set so as to cover all the region in which the engine is running, the engine is driven in a lean air-fuel ratio, for example, in the constantly running region, particularly in the middle-rotational and middle load region. In the region other than the region where the engine is running in such a lean air-fuel ratio, it can be driven, for example, in the stoichiometric air-fuel ratio.

Figure 23:
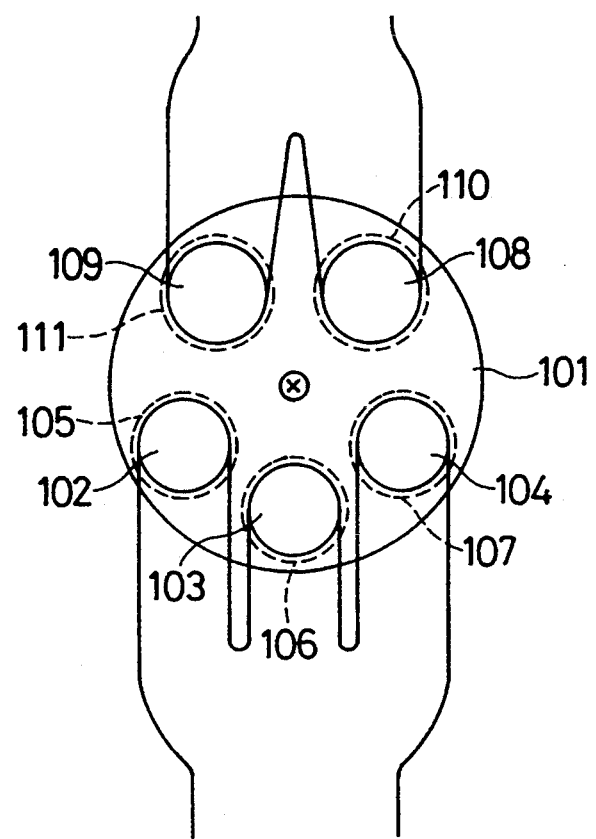
FIG. 23 is a schematic plan view showing the spark ignition type reciprocating engine with three intake valves and two exhaust valves, according to an embodiment of the present invention.

FIG. 23 shows an example of an engine having three intake valves and two exhaust valves; reference numeral 101 stands for a combustion chamber; reference numerals 102, 103 and 104 for intake ports; reference numerals 105, 106 and 107 for intake valves; reference numerals 108 and 109 for exhaust ports; reference numerals 110 and 111 for exhaust valves; and reference numeral 112 for an ignition plug.

As described hereinabove, the supercharged internal combustion engine according to the present invention can suppress the temperature of exhaust gases from elevating and enhance reliability upon the exhaust system.

The present invention is not intended in any manner to be limited to the embodiments as described hereinabove, and it is to be understood that any variations or modifications made so as not to deviate from the basic concepts of the present invention are interpreted as being contained within the spirit of the present invention.

What is claimed is:

1. A four cycle internal combustion engine with a supercharger, said engine including a piston arranged to be inserted into a cylinder so as to move in a reciprocating way, said engine including a cylinder head mounted at one end of said cylinder and an intake valve mounted in an intake port of said cylinder head, wherein:
    a bore size of the cylinder ranges from approximately 43 mm to 67 mm;
    a ratio of a stroke of the piston to the bore size of the cylinder is equal to or larger than 1; and
    the supercharger is a mechanically driven supercharger.

2. A supercharged internal combustion engine as set forth in claim 1, further comprising a volume of the cylinder ranges from approximately 110 cc to 400 cc.

3. A supercharged internal combustion engine as set forth in claim 1, wherein when a mean intake air mach number is 0.5, a number of rotations of the engine is at least 5,000 rpm.

4. A supercharged internal combustion engine as set forth in claim 1, wherein a compression ratio of the engine is at least 9.

5. A supercharged internal combustion engine as set forth in claim 1, further comprising an intake valve and a valve timing change-over mechanism, said valve timing change-over mechanism changing a timing of when the intake valve closes.

6. A supercharged internal combustion engine as set forth in claim 5, wherein:
    a running region where the engine is running is divided into three running regions: a first running region wherein the number of the engine is low and the load of the engine is low;
    a second running region wherein the number of rotation of the engine is smaller than a predetermined value, other than the first running region; and
    a third running region wherein the number of rotation of the engine is equal to or larger than the predetermined value;
    wherein, in the first running region, the timing of closing the intake valve is delayed later than in any other running region;
    wherein, in the second running region, the timing of closing the intake valve is earlier than in the first running region; and
    wherein, in the third running region, the timing of closing the intake valve is earlier than the timing of closing the intake valve in the first running region.

7. A supercharged internal combustion engine as set forth in claim 6, wherein:
    the timing of closing the intake valve in at least one of the second running region and the third running region are set as a crank angle of approximately 70 degrees after the bottom dead center.

8. A supercharged internal combustion engine as set forth in claim 7, wherein:
    the overlap of the open state of the intake valve with the open state of the exhaust valve in the third running region is set to approximately 80 degrees.

9. A supercharged internal combustion engine as set forth in claim 6, wherein:
    the overlap of the open state of the intake valve with the open state of the exhaust valve in the third running region is set to approximately 80 degrees.

10. A supercharged internal combustion engine as set forth in claim 1, further comprising:
    an EGR means for recirculating exhaust gases to a combustion chamber.

11. A supercharged internal combustion engine as set forth in claim 10, wherein:
    the EGR means comprises a first EGR means and a second EGR means;

the first EGR means for recirculating exhaust gases having a higher temperature to the combustion chamber; and the second EGR means for recirculating exhaust gases having a lower temperature to the combustion chamber.

12. A supercharged internal combustion engine as set forth in claim 11, wherein:

the exhaust gases are recirculated only by the first EGR means during a low load on the engine.

13. A supercharged internal combustion engine as set forth in claim 12, wherein:

the exhaust gases are recirculated only by the second EGR means during a high load on the engine.

14. A supercharged internal combustion engine as set forth in claim 1, wherein:

one cylinder has a plurality of intake ports and a plurality of exhaust ports;

a discrete intake passage is communicated with each of the intake ports over a predetermined length from the combustion chamber; and a portion of the discrete intake passage is provided with a shutter valve to be opened or closed in accordance with a running state of the engine.

15. A supercharged internal combustion engine as set forth in claim 14, wherein the shutter valve is adapted to be closed in a region wherein the number of rotations of the engine is low and opened in a region wherein the number of rotations of the engine is high.

16. A supercharged internal combustion engine as set forth in claim 1, further comprising a sub-chamber communicated with the combustion chamber through a sub-chamber port arranged to be opened and closed with a sub-chamber valve;

wherein the timing of opening the sub-chamber valve is set to be in the process of a stroke of compression and the timing of closing the sub-chamber valve is set before the timing of ignition.

17. A supercharged internal combustion engine as set forth in claim 1, wherein the engine is run in an air-fuel ratio leaner than a stoichiometric air-fuel ratio at least in a predetermined running region.

18. A supercharged internal combustion engine as set forth in claim 1, wherein a displacement of the engine satisfies the following formula:

$$W = 543.3\,[V/1000]^2 - 508.8\,[V/1000] + 815$$

wherein W is the weight of the body of the vehicle in kg and V is the displacement of the engine in cc.

19. A four cycle internal combustion engine with a supercharger, said engine including a piston arranged to be inserted into a cylinder so as to move in a reciprocating way, said engine including a cylinder head mounted at one end of said cylinder and an intake valve mounted in an intake port of said cylinder head, wherein:

a ratio of a stroke of the piston to the bore size of the cylinder is equal to or larger than 1;

a number of rotations of the engine when a mean speed of the piston is 20 m/s is larger than a number of rotations of the engine when a mean intake air mach number is 0.5; and the supercharger is a mechanically driven supercharger.

20. A supercharged internal combustion engine as claimed in claim 19, wherein:

the difference obtained by subtracting the number of rotations of the engine when the mean speed of the piston is 20 m/s from the number of rotations of the engine when the mean intake air mach number is 0.5, is not greater than 2,000 rpm.

21. A supercharged internal combustion engine as claimed in claim 20, wherein:

when the mean intake air mach number is 0.5, the number of rotations of the engine is at least 5,000 rpm.

22. A supercharged internal combustion engine as claimed in claim 20, wherein a volume of the cylinder ranges from approximately 110 cc to 400 cc.

23. A supercharged internal combustion engine as claimed in claim 19, wherein:

when the mean intake air mach number is 0.5, the number of rotations of the engine is at least 5,000 rpm.

24. A supercharged internal combustion engine as claimed in claim 19, wherein a volume of the cylinder ranges from approximately 110 cc to 400 cc.

25. A supercharged internal combustion engine as claimed in claim 19, wherein a displacement of the engine satisfies the following formula:

$$W = 543.3\,[V/1000]^2 - 508.8\,[V/1000] + 815$$

wherein W is the weight of the body of the vehicle in kg and V is the displacement of the engine in cc.

26. A four cycle internal combustion engine with a supercharger, the engine including a piston arranged to be inserted into a cylinder so as to move in a reciprocating way, said engine including a cylinder head mounted at one end of said cylinder and an intake valve mounted in an intake port of said cylinder head, wherein;

a bore size of the cylinder ranges from approximately 43 to 67 mm;

a ratio of a stroke of the piston to the bore size of the cylinder is equal to or larger than 1; and a compression ratio of the engine is at least 9.

27. A supercharged internal combustion engine as claimed in claim 26, wherein a volume of the cylinder ranges from approximately 110 cc to 400 cc.

28. A supercharged internal combustion engine as claimed in claim 26, wherein:

when the mean intake air mach number is 0.5, the number of rotations of the engine is at least 5,000 rpm.

29. A supercharged internal combustion engine as claimed in claim 26, wherein a displacement of the engine satisfies the following formula:

$$W = 543.3\,[V/1000]^2 - 508.8\,[V/1000] + 815$$

wherein W is the weight of the body of the vehicle in kg and V is the displacement of the engine in cc.

30. A four cycle internal combustion engine with a supercharger, the engine including a piston arranged to be inserted into a cylinder so as to move in a reciprocating way, said engine including a cylinder head mounted at one end of said cylinder and an intake valve mounted in an intake port of said cylinder head, wherein;

a ratio of a stroke of the piston to the bore size of the cylinder is equal to or larger than 1;

a compression ratio of the engine is at least 9; and a number of rotations of the engine when a mean speed of the piston is 20 m/s is larger than a number of rotations of the engine when a mean intake air mach number is 0.5.

31. A supercharged internal combustion engine as claimed in claim 30, wherein:
the difference obtained by subtracting the number of rotations of the engine when the mean speed of the piston is 20 m/s from the number of rotations of the engine when the mean intake air mach number is 0.5, is not greater than 2,000 rpm.

32. A supercharged internal combustion engine as claimed in claim 31, wherein;
when the mean intake air mach number is 0.5, the number of rotations of the engine is at least 5,000 rpm.

33. A supercharged internal combustion engine as claimed in claim 31, wherein a volume of the cylinder ranges from approximately 110 cc to 400 cc.

34. A supercharged internal combustion engine as claimed in claim 30, wherein;
when the mean intake air mach number is 0.5, the number of rotations of the engine is at least 5,000 rpm.

35. A supercharged internal combustion engine as claimed in claim 30, wherein a volume of the cylinder ranges from approximately 110 cc to 400 cc.

36. A supercharged internal combustion engine as claimed in claim 30, wherein a displacement of the engine satisfies the following formula:

$$W = 543.3\ [V/1000]^2 - 508.8\ [V/1000] + 815$$

wherein W is the weight of the body of the vehicle in kg and V is the displacement of the engine in cc.

37. An internal combustion engine with a supercharger, the engine including a piston arranged to be inserted into a cylinder so as to move in a reciprocating way, the engine having two intake valves and two exhaust valves per cylinder wherein:
a bore size of the cylinder ranges from approximately 50 mm to 67 mm;
a ratio of a stroke of the piston to the bore size of the cylinder is at least 1; and
a compression ratio of the engine is at least 9.

38. A supercharged internal combustion engine as claimed in claim 37, wherein a volume of the cylinder ranges from approximately 150 cc to 400 cc.

39. A supercharged internal combustion engine as claimed in claim 37, wherein:
the difference obtained by subtracting the number of rotations of the engine when the mean speed of the piston is 20 m/s from the number of rotations of the engine when the mean intake air mach number is 0.5, is not greater than 2,000 rpm.

40. A supercharged internal combustion engine as claimed in claim 39, wherein:
when the mean intake air mach number is 0.5, the number of rotations of the engine is at least 5,000 rpm.

41. A supercharged internal combustion engine as claimed in claim 37, wherein:
when the mean intake air mach number is 0.5, the number of rotations of the engine is at least 5,000 rpm.

42. A supercharged internal combustion engine as claimed in claim 37, wherein a displacement of the engine satisfies the following formula:

$$W = 543.3\ [V/1000]^2 - 508.8\ [V/1000] + 815$$

wherein W is the weight of the body of the vehicle in kg and V is the displacement of the engine in cc.

43. An internal combustion engine with a supercharger, the engine including a piston arranged to be inserted into a cylinder so as to move in a reciprocating way, the engine having three intake valves and two exhaust valves per cylinder wherein:
a bore size of the cylinder ranges from approximately 43 mm to 49.5 mm;
a ratio of a stroke of the piston to the bore size of the cylinder is equal to or larger than 1;
a compression ratio of the engine is at least 9.

44. A supercharged internal combustion engine as claimed in claim 43, wherein a volume of the cylinder ranges from approximately 110 cc to 295 cc.

45. A supercharged internal combustion engine as claimed in claim 43, wherein:
the difference obtained by subtracting the number of rotations of the engine when the mean speed of the piston is 20 m/s from the number of rotations of the engine when the mean intake air mach number is 0.5, is not greater than 2,000 rpm.

46. A supercharged internal combustion engine as claimed in claim 45, wherein:
when the mean intake air mach number is 0.5, the number of rotations of the engine is at least 5,000 rpm.

47. A supercharged internal combustion engine as claimed in claim 43, wherein:
when the mean intake air mach number is 0.5, the number of rotations of the engine is at least 5,000 rpm.

48. A supercharged internal combustion engine as claimed in claim 42, wherein a displacement of the engine satisfies the following formula:

$$W = 543.3\ [V/1000]^2 - 508.8\ [V/1000] + 815$$

wherein W is the weight of the body of the vehicle in kg and V is the displacement of the engine in cc.

* * * * *